United States Patent
Yeap et al.

(10) Patent No.: US 7,660,575 B2
(45) Date of Patent: Feb. 9, 2010

(54) ADAPTER FOR SECURE VOIP COMMUNICATIONS

(75) Inventors: Tet Hin Yeap, Ottawa (CA); William G. O'Brien, Orleans (CA); Xiaoli Ren, Ottawa (CA); Dafu Lou, Ottawa (CA)

(73) Assignee: BCE Inc., Verdun, Quebec (CA)

( * ) Notice: Subject to any disclaimer, the term of this patent is extended or adjusted under 35 U.S.C. 154(b) by 930 days.

(21) Appl. No.: 11/001,096

(22) Filed: Dec. 2, 2004

(65) Prior Publication Data

US 2005/0144445 A1 Jun. 30, 2005

(30) Foreign Application Priority Data

Dec. 15, 2003 (CA) ................. PCT/CA2003/01930

(51) Int. Cl.
*H04M 3/16* (2006.01)
(52) U.S. Cl. ........................................ 455/411; 379/442
(58) Field of Classification Search ........................ None
See application file for complete search history.

(56) References Cited

U.S. PATENT DOCUMENTS 5,974,142 A * 10/1999 Heer et al. ................. 379/442
6,188,756 B1 * 2/2001 Mashinsky ............. 379/207.04

FOREIGN PATENT DOCUMENTS

| EP | 1 326 414 A2 | 7/2003 |
| EP | 1 065 871 B1 | 12/2004 |
| FR | 2 821 227 A1 | 8/2002 |
| GB | 2363549 A | 12/2001 |
| GB | 2385740 A | 8/2003 |
| WO | WO 02/084917 A2 | 10/2002 |
| WO | WO 02/084917 A3 | 10/2002 |
| WO | WO 03/041362 A3 | 5/2003 |
| WO | PCT/CA2003/001930 | 11/2005 |

OTHER PUBLICATIONS

VoIP Security document: pp. 1-32.
PSTN—Switching and switch control: A present-day local exchange; Ericsson; Understanding Telecommunications; Part B, Chapter 3; pp. 1-5; downloaded from : http://www.ericsson.com/support/telecom/part-b/b-3-2.shtml; Nov. 7, 2003.

(Continued)

*Primary Examiner*—Erika A Gary

(57) ABSTRACT

Method and adapter apparatus for securing information exchanged between a calling party and a called party. A first signal is generated, which is representative of an analog probe signal. The first signal is released towards the called party. Responsive to receipt from the called party of a second signal responsive to the analog probe signal and indicative of an ability of the called party to participate in a secure information exchange, negotiations are performed with the called party to securely exchange subsequent information with the called party. In this way, the adapter apparatus can securely exchange information without prior knowledge of whether the called party is secure-capable or secure-incapable and without prior knowledge of whether the called party is a POTS phone or a packet-switched device.

59 Claims, 16 Drawing Sheets

OTHER PUBLICATIONS

Virtual private networks, Part 2; presented by devoloperWorks, your source for great tutorials; downloaded from: http://www.ibm.com/developerWorks; pp. 1-14.

Worldwide Leader in Securing the Internet; IKE Tutorial; Check Point; Software Technologies Ltd.; We Secure the Internet; 33 pages.

Nortel Networks; Securing Voice across the Internet; How Nortel Networks Contivity can secure i2002, i2004, and i2050 VoIP communications; 4 pages.

Check Point; Software Technologies Ltd.; We Secure the Internet; IPSec Versus "Clientless"VPNs for Remote Access (2002), pp. 1-9.

Tutorial: Overview: Understanding The OSI 7-Layer Model; by Neil Briscoe; PC Network Advisor; www.itp-journals.com; Issue 120 (Jul. 2000), pp. 13 and 14.

Office Action mailed on Oct. 30, 2009 in connection with Canadian Patent Application 2,546,743.

* cited by examiner

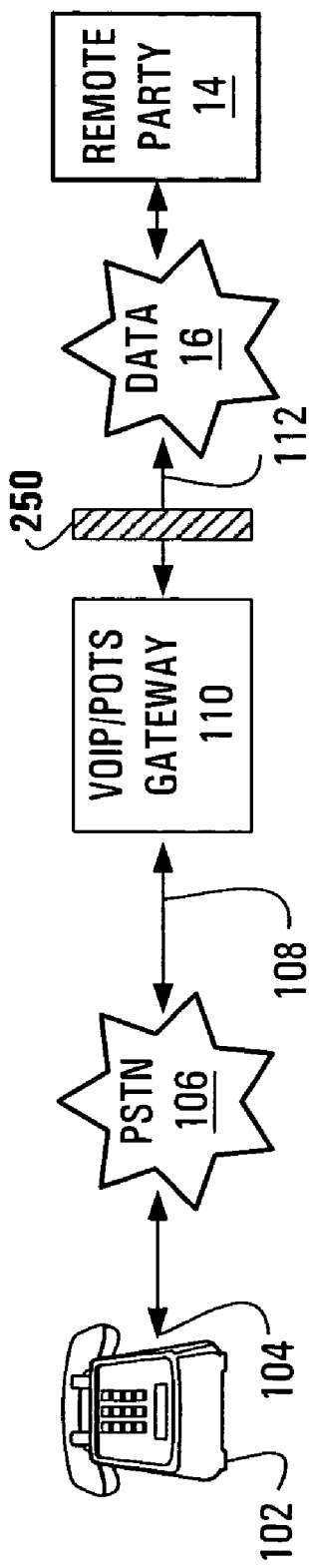
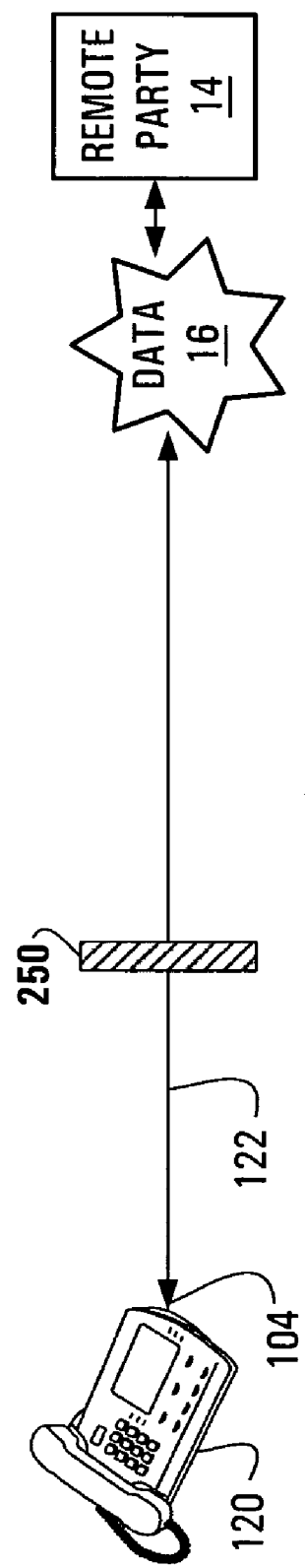
FIG. 2C
FIG. 2D

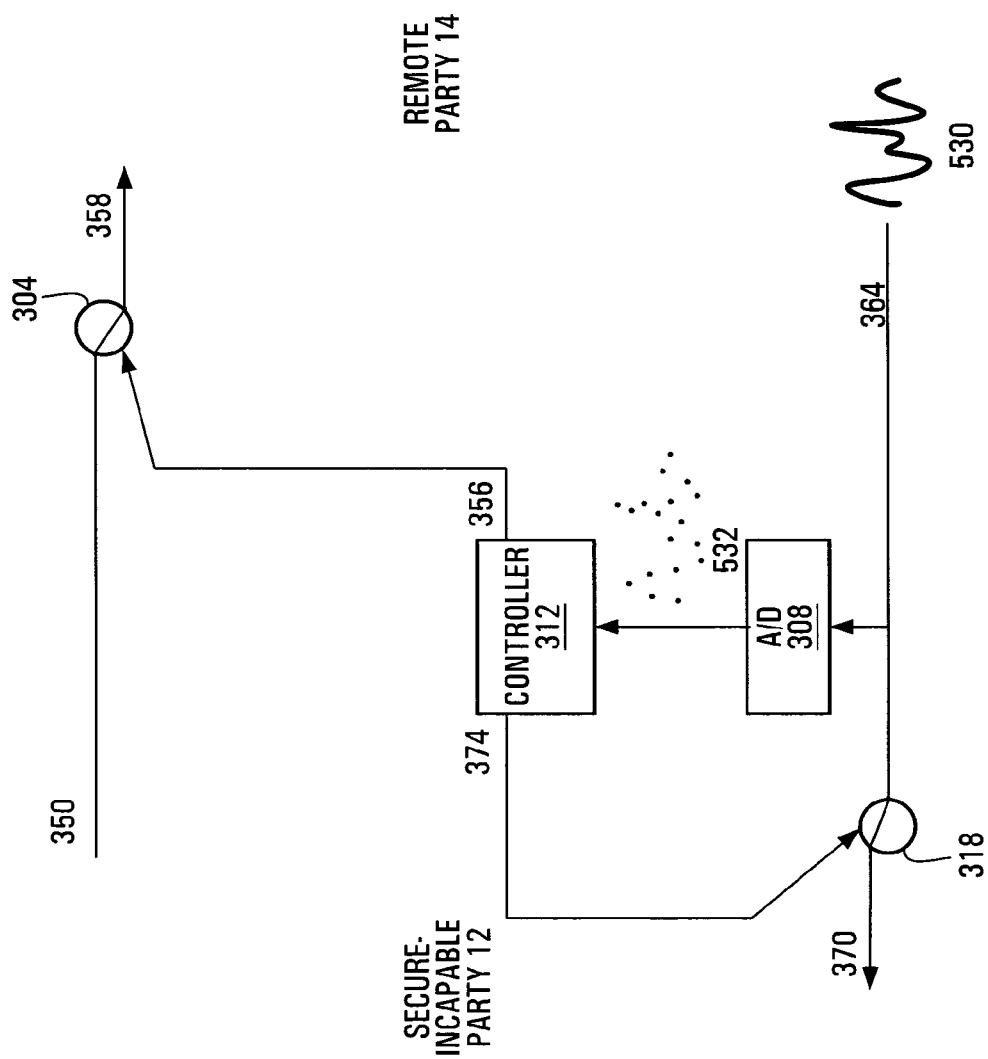

ADAPTER FOR SECURE VOIP COMMUNICATIONS

FIELD OF THE INVENTION

The present invention relates generally to telecommunications and, in particular, to methods and apparatus for allowing legacy devices to participate in secure voice-over-packet communications.

BACKGROUND OF THE INVENTION

The power of portable communications devices such as Pocket PCs, PDAs and tablet PCs, together with the emergence of wireless local area networks (LANs), is viewed as an attractive combination by organizations seeking to create a highly mobile extension of the corporate LAN. In one scenario, users can place telephone calls to each other over the packet-based network rather than utilize dedicated circuits in the public-switched telephone network (PSTN). When the packets are Internet Protocol (IP) packets, this technique is known as "voice over IP", or VoIP for short. In VoIP, analog speech signals received from an analog speech audio source, for example a microphone, are digitized, compressed and translated into IP packets for transmission over the wireless LAN.

Corporations have generally recognized that the deployment of VoIP allows a more efficient use of their telecommunications infrastructure and, in the case of long distance calls, can be used to bypass the toll structure imposed by the service providers that operate the PSTN. However, an underlying security problem exists when a VoIP application is implemented in mobile communications devices. Specifically, the wireless operating mode of these devices makes them vulnerable to "air gap" attacks which can lead to unauthorized eavesdropping of voice conversations, for example.

Similar security problems arise in other VoIP applications which lie outside the wireless realm. In particular, home PCs that connect to an Internet service provider (ISP) via a residential telephone (POTS) line can implement a VoIP application. In such an environment, the home PC provides the digitizing, compression and translation functions. In this case, the existence of a connection to the Internet via the ISP can be viewed as an alternative to joining two endpoint communication devices that ordinarily would connect through the PSTN. However, as the Internet is basically a collection of routers belonging to different entities, each such router represents a point of vulnerability, providing easy and undetectable replication of the data for malicious or illegal purposes.

Yet another scenario where a security breach may occur is in the case of a POTS-to-POTS call, where at least part of the call traverses a packet-switched network. Gateways are positioned at the entry and exit points of the packet-switched network, providing POTS-to-IP and IP-to-POTS conversion. Such an arrangement is increasingly likely to take place as carriers head towards voice/data convergence and utilize their packet-switched networks more effectively. However, under this scenario, the IP packets used to transport the call through the packet-switched network are exposed to detection and replication at the gateways, as well as at each router traversed within the packet-switched network.

It will be appreciated that the common denominator to each of the above security breach scenarios is the vulnerability of IP packets as they transit a packet-switched network. Whereas access to a connection that transits only the PSTN between the two end points of a call requires the line to be physically "tapped", the existence of a packet-switched network along the communications path provides a means for eavesdroppers to access the data being transmitted without detectably disturbing the connection, allowing the data so obtained to be collected, stored, analyzed, retransmitted, etc. without either party's authorization or even knowledge.

Accordingly, the focus has shifted to providing security for VoIP calls. One approach to increasing the security of a VoIP call has been the use of encryption. Specifically, in the case of two VoIP devices responsible for digitizing and packetizing the analog signal received from the user at either end of a call, it is possible to design the VoIP devices to provide encryption and decryption functionality, which make it difficult to decipher the underlying data without knowledge of a special key. While it may be appropriate to implement this solution as an added feature of new VoIP devices, it does not solve the problem of a legacy device, such as a first-generation VoIP device or a standard POTS phone, wishing to participate in a VoIP call that is required to be secure while it potentially traverses a packet-switched network.

Clearly, therefore, a need exists in the industry to allow legacy devices, including POTS phones and first-generation VoIP phone, to establish secure VoIP communications with a called party endpoint.

SUMMARY OF THE INVENTION

A first broad aspect of the present invention seeks to provide a method of securing information exchanged between a calling party and a called party. The method comprises generating a first signal representative of an analog probe signal and releasing the first signal towards the called party. Responsive to receipt from the called party of a second signal responsive to the analog probe signal and indicative of an ability of the called party to participate in a secure information exchange, the method further comprises negotiating with the called party to securely exchange subsequent information with the called party.

A second broad aspect of the present invention seeks to provide an apparatus for securing communications between a calling party and a called party. The apparatus comprises a controller operative to generate a first signal representative of an analog probe signal, an output interface operative to release the first signal towards the called party, and an input interface operative to receive a second signal representative of an analog response signal responsive to the analog probe signal and indicative of an ability of the called party to participate in a secure information exchange. The controller is responsive to the second signal to negotiate with the called party a secure exchange of information with the called party.

A third broad aspect of the present invention seeks to provide an apparatus for securing communications between a calling party and a called party. The apparatus comprises means for generating a first signal representative of an analog probe signal, means for releasing the first signal towards the called party, means for receiving a second signal representative of an analog response signal responsive to the analog probe signal and indicative of an ability of the called party to participate in a secure information exchange and means responsive to the second signal, for negotiating with the called party a secure exchange of information with the called party.

These and other aspects and features of the present invention will now become apparent to those of ordinary skill in the art upon review of the following description of specific embodiments of the invention in conjunction with the accompanying drawings.

Those skilled in the art will appreciate that the reference to packets as used herein is intended to encompass any type of packet, including but not limited to Internet Protocol (IP) packets, Ethernet frames, Asynchronous Transfer Mode (ATM) cells and other types of datagrams. Similarly, the terms "VoIP" and "VoIP phone" is used in the generic sense to include any "voice-over-packet" technique or device, without limitation to a specific standard.

BRIEF DESCRIPTION OF THE DRAWINGS

In the accompanying drawings:

FIGS. 2A-2D are block diagrams showing various possible positions of an adapter that is used to address the security problems arising in the scenarios of FIGS. 1A-1C;

FIGS. 5A-5E show activity of the POTS adapter of FIG. 3 during a process in accordance with an embodiment of the present invention;

DETAILED DESCRIPTION OF THE EMBODIMENTS

Figure 1A:
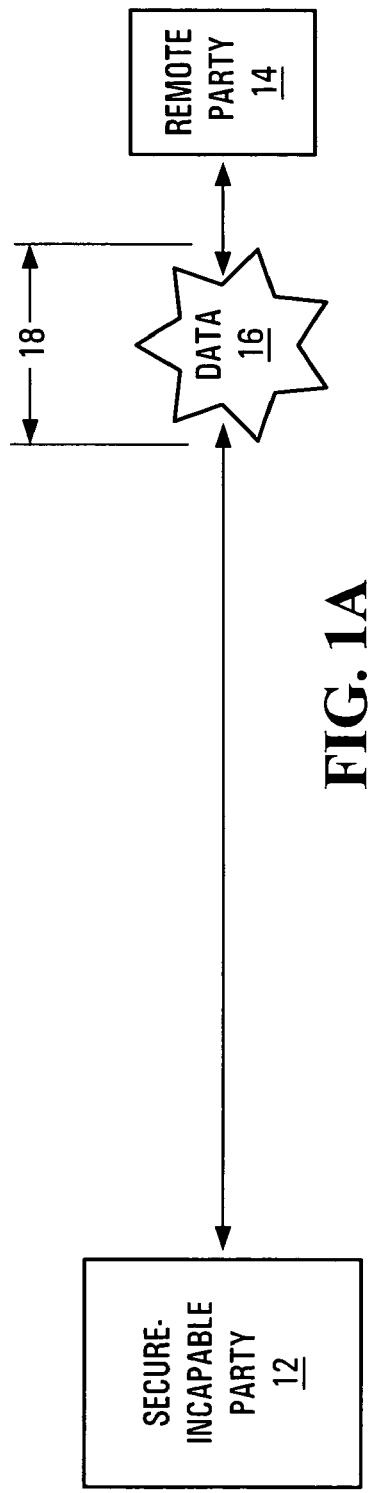
FIGS. 1A-1C are block diagrams of various scenarios where security of a VoIP connection may be compromised.

FIG. 1A shows, conceptually two parties 12, 14 engaged in a call, where a portion 18 of the call traverses a data network 16. The portion 18 may transport packets in accordance with an existing VoIP protocol including but not limited to H.323, Session Initialization Protocol ("SIP") and Master Gateway Control Protocol ("MGCP"). It is assumed throughout this specification that party 12 is not capable of securely exchanging information across the data network 16. Stated differently, party 12 can be characterized as "secure-incapable". On the other hand, party 14, which is remote to party 12 and is hereinafter referred to as the "remote party", may or may not be capable of securely exchanging information across the data network 16. In other words, the remote party 14 may or may not be "secure-capable". In either case, the security capabilities of the remote party 14 are not known to the secure-incapable party 12.

Figure 1B:
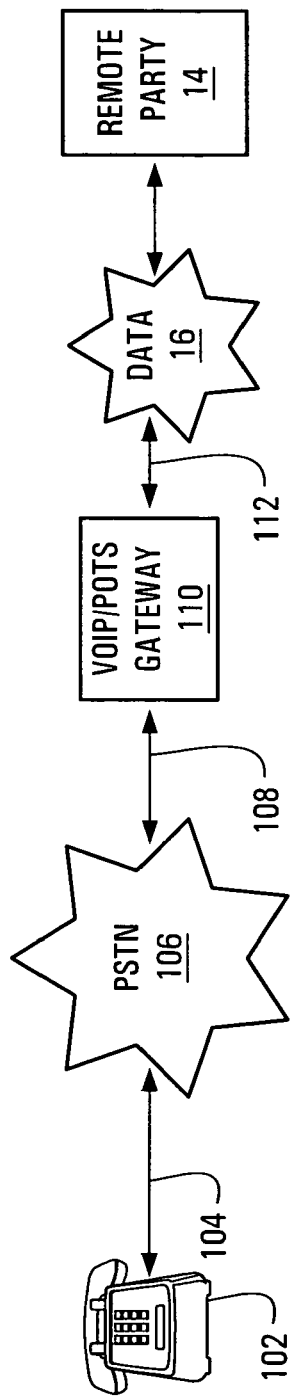

With reference to FIG. 1B, a first example of a secure-incapable party 12 is a POTS phone 102. The POTS phone 102 is connected via a conventional analog (POTS) line 104 to the public switched telephone network (PSTN) 106. The PSTN 106 is connected via a POTS line 108 to a VoIP/POTS gateway 110. The gateway 110 is connected via a communication link 112 to the data network 16. When the POTS phone 102 is in communication with the remote party 14 across the data network 16, a signal carrying an analog waveform travels from the POTS phone 102 through the PSTN 106. The signal exits the PSTN 106 and is typically digitized, compressed and translated by the gateway 110 into the payload portion of a stream of packets. The packets travel across the data network 16 and eventually reach the remote party 14. A similar process occurs in the opposite direction. Specifically, the gateway 110 receives packets from the remote party 14 via the data network 16 and a communication link 112. The gateway 110 converts the payload portion of the received packets into an analog waveform which arrives at the POTS phone 102 via the PSTN 106 and the POTS line 108.

Figure 1C:

With reference to FIG. 1C, a second example of a secure-incapable party 12 is a networked computing device 120 capable of conventional first-generation voice-over-packet communication. Such device is hereinafter referred to as a "VoIP phone" 120. The VoIP phone 120 is connected to the data network 16 by a communication link 122. When the VoIP phone 120 is in communication with the remote party 14 across the data network 16, a signal representative of a talker's analog waveform is typically digitized, compressed and translated into the payload portion of packets by the VoIP phone 120. The packets travel from the VoIP phone 120 to the data network 16 along the communication link 122. In the opposite direction, each of the packets received by the VoIP phone 120 from the data network 16 via the communication link 122 carries a payload portion which is converted by the VoIP phone 120 into an output analog waveform.

Due to the presumed inability of party 12 to securely exchange information across the data network, the portion 18 of the call is vulnerable to security breaches wherever packets enter, exit or are routed within the data network 16. To allow the secure-incapable party 12 to nevertheless establish the VoIP connection 18 with the remote party 14 across the data network 16 in a secure fashion, the present invention provides for an adapter to be positioned between the secure-incapable party 12 and the data network 16. At least four security scenarios can be devised which address this issue.

Figure 2A:
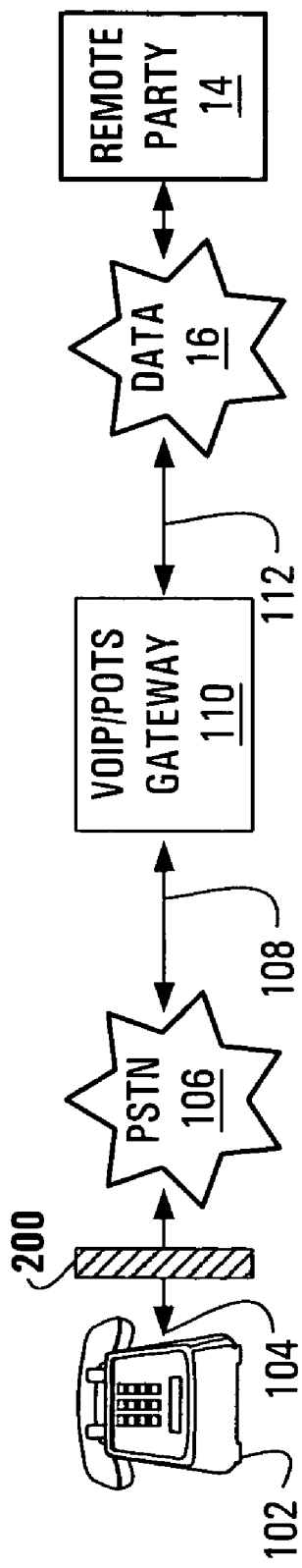

Under a first security scenario, shown in FIG. 2A, a POTS adapter 200 is placed on the POTS line 104 between the POTS phone 102 and the PSTN 106. For example, the POTS adapter 200 can be provided as a stand-alone device between the POTS phone 102 and a wall jack into which the POTS phone 102 is plugged. The POTS adapter 200, whose structure and operation will be described herein below, allows the portion of the connection between the POTS adapter 200 and the remote party 14 to be rendered secure.

Figure 2B:
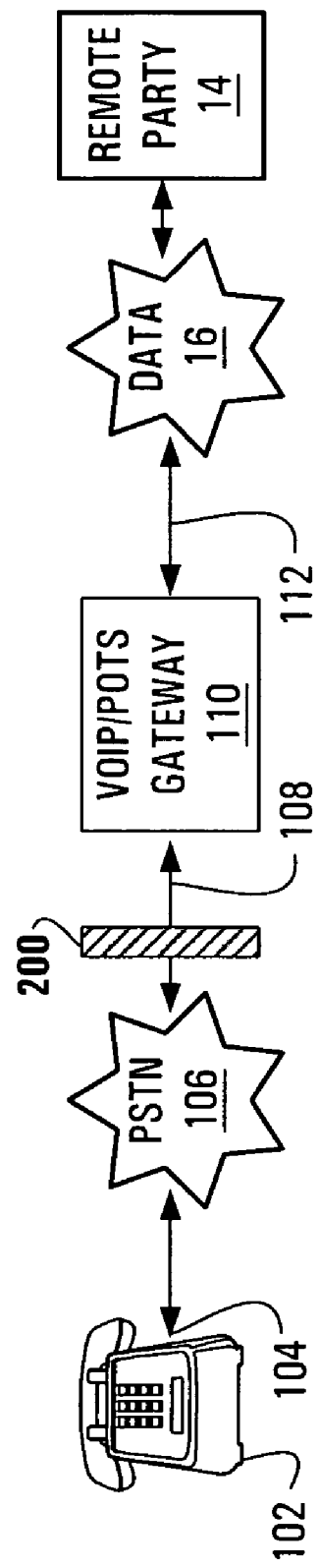

Under a second security scenario, shown in FIG. 2B, the POTS adapter 200 is placed on the POTS line 108 between the PSTN 106 and the gateway 110. For example, the POTS adapter 200 can be provided as a stand-alone device connected to a PSTN switch in the PSTN 106. Alternatively, the POTS adapter 200 can be integrated with the gateway 110. The POTS adapter 200 allows the portion of the connection between the POTS adapter 200 and the remote party 14 to be rendered secure.

Under a third security scenario, shown in FIG. 2C, a VoIP adapter 250 is placed on the communication link 112 between the gateway 110 and the data network 16. For example, the VoIP adapter 250 can be provided as a functional component of a VoIP softswitch. The VoIP adapter 250, whose structure are operation will be described herein below, allows the portion of the connection between the VoIP adapter 250 and the remote party 14 to be rendered secure.

Under a fourth security scenario, shown in FIG. 2D, the VoIP adapter 250 is placed on the communication link 122 between the VoIP phone 120 and the data network 16. For example, the VoIP adapter 250 can be provided as a hardware add-on or a software upgrade to the VoIP phone 120 or as a functional component of a softswitch. The VoIP adapter 250 allows the portion of the connection between the VoIP adapter 250 and the remote party 14 to be rendered secure.

Figure 3:
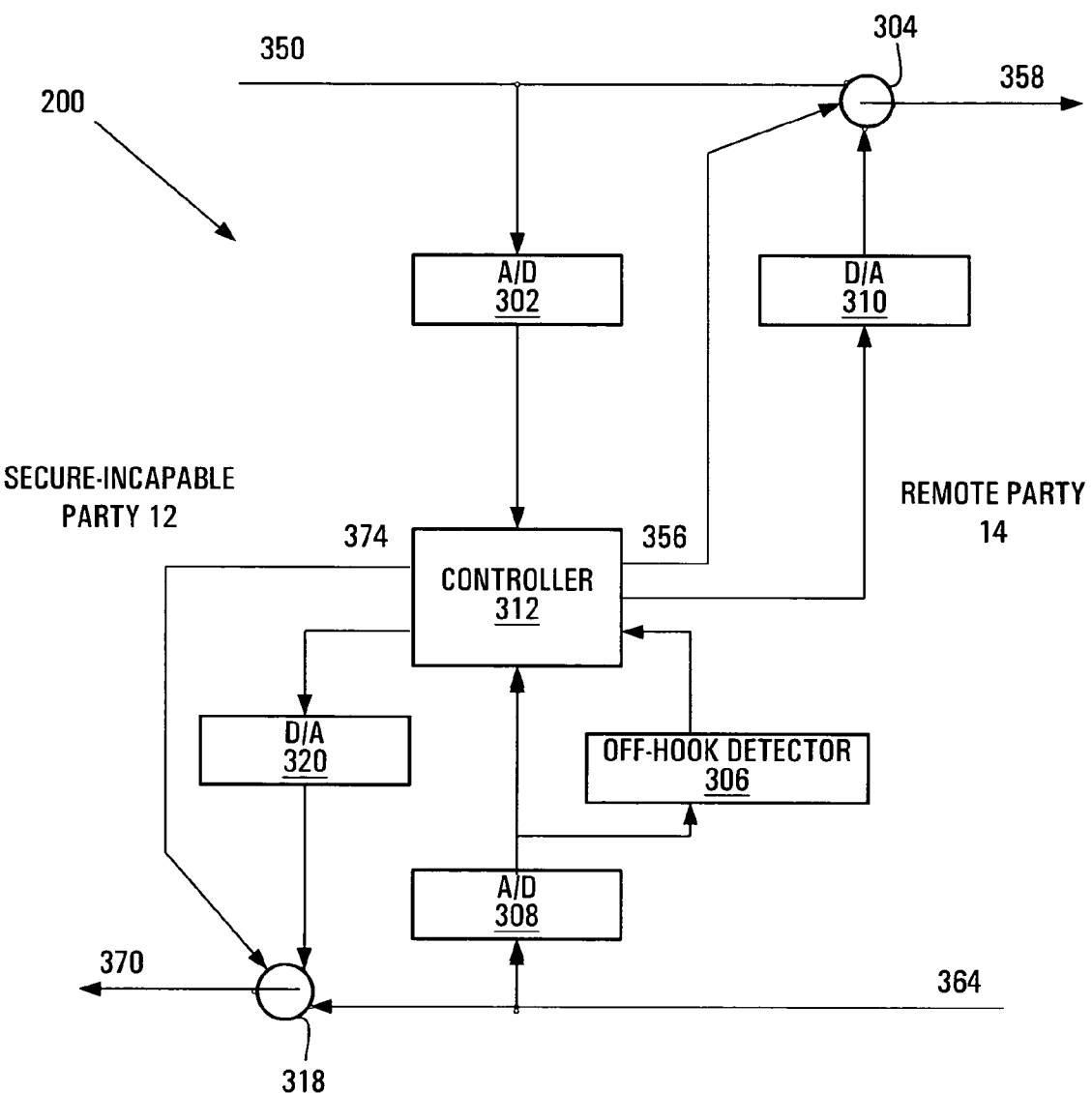
FIG. 3 shows in schematic form a block diagram of a POTS adapter.

Reference is now made to FIG. 3, which shows the structure of a POTS adapter 200 in accordance with an embodiment of the present invention. The POTS adapter 200 interfaces with the secure-incapable party 12 via a pair of communication links 350, 370 on POTS line 104 (FIG. 2A) or POTS line 108 (FIG. 2B). Specifically, link 350 carries an analog waveform from the local party and link 370 carries an analog waveform towards the secure-incapable party 12. In an example, the communication links 350, 370 may form individual wires of a twisted pair; in another embodiment, the links 350, 370 may share a common bidirectional physical medium, which may be wireline, electromagnetic, optical, etc. Additionally, the POTS adapter 200 interfaces with the remote party 14 via a pair of communication links 358, 364 on POTS line 104 (FIG. 2A) or POTS line 108 (FIG. 2B). Specifically, link 364 carries an analog waveform received from the remote party 14, while link 358 carries an analog waveform towards the remote party 14. In an example, the communication links 358, 364 may form individual wires of a twisted pair; in another embodiment, the links 358, 364 may share a common bidirectional physical medium, which may be wireline, electromagnetic, optical, etc.

The POTS adapter 200 comprises a controller 312 and an input interface. The input interface includes a first analog-to-digital converter 302 having an input connected to link 350 and having an output connected to the controller 312, which provides the controller 312 with a digital rendition of the analog signal arriving from the secure-incapable party 12. The input interface also includes a second analog-to-digital converter 308 having an input connected to link 364 and having an output connected to the controller 312, which provides the controller 312 with a digital rendition of the analog signal arriving from the remote party 14.

In addition, the POTS adapter 200 comprises an off-hook detector 306, which may be integrated with the controller 312 or may be implemented as a separate hardware device that is connected in parallel with the output of the second analog-to-digital converter 308. The off-hook detector 306 comprises suitable circuitry, software and/or control logic for detecting, on the basis of the signal received from the remote party 14, whether the remote party 14 has entered an off-hook condition. Such condition occurs in standard telephony upon the remote party 14 picking up the phone and is usually manifested as a change in the line voltage, which is detected by the off-hook detector 306. As an output, the off-hook detector 306 may simply provide the controller 312 with an indication as to when an off-hook condition has been detected. Those skilled in the art will find it within their ability to design a suitable circuit, device or software for this purpose.

Furthermore, the POTS adapter 200 comprises an output interface, which includes a first transfer unit 304 and a second transfer unit 318, which can be implemented as two-input, one-output switches. For example, the first transfer unit 304 has an output connected to link 358, a first input connected to link 350 and a second input connected to an output of the controller 312 via a first digital-to-analog converter 310. The first transfer unit 304 is operative to transfer the signal on one of its inputs over to its output on the basis of a control signal received from the controller 312 via a control link 356. Similarly, the second transfer unit 318 has an output connected to link 370, a first input connected to link 364 and a second input connected to an output of the controller 312 via a second digital-to-analog converter 320. The second transfer unit 318 is operative to transfer the signal on one of its inputs over to its output on the basis of a control signal received from the controller 312 via a control link 374.

The controller 312 comprises suitable circuitry, software and/or control logic for processing the signals received from the analog-to-digital converters 302, 308 and the off-hook generator 306, and consequently generating the signals supplied to the digital-to-analog converters 310, 320, as well as the control signals which control the first and second transfer units 304, 318 via control links 356, 374, respectively. The various signals are processed and generated in accordance with a method which is described in further detail later on.

Figure 4:
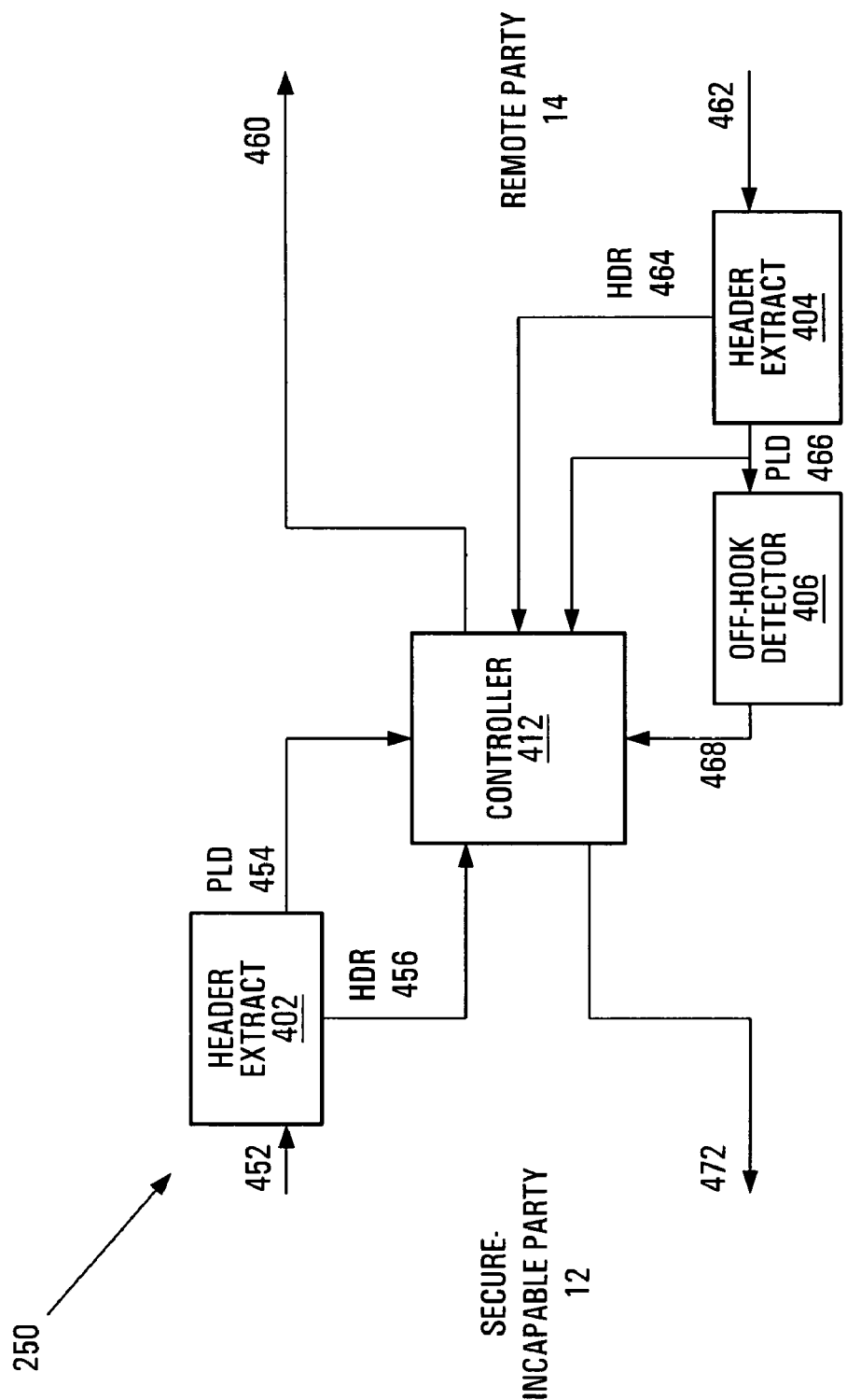
FIG. 4 shows in schematic form a block diagram of a VoIP adapter.

Reference is now made to FIG. 4, which shows the structure of the VoIP adapter 250, in accordance with an embodiment of the present invention. The VoIP adapter 250 interfaces with the secure-incapable party 12 via a pair of communication links 452, 472 on communication link 112 (FIG. 2C) or communication link 122 (FIG. 2D). Specifically, link 452 carries a packet stream from the secure-incapable party 12 and link 472 carries a packet stream towards the secure-incapable party 12. In an example, the communication links 452, 472 may be dedicated physical links; in another embodiment, the links 452, 472 may share a common bidirectional physical medium, which may be wireline, electromagnetic, optical, etc. Additionally, the VoIP adapter 250 interfaces with the remote party 14 via a pair of communication links 460, 462 on communication link 112 (FIG. 2C) or communication link 122 (FIG. 2B). Specifically, link 460 carries packets received from the remote party 14, while link 462 carries packets towards the remote party 14. In an example, the communication links 460, 462 may be dedicated physical links; in another embodiment, the links 460, 462 may share a common bidirectional physical medium, which may be wireline, electromagnetic, optical, etc.

The VoIP adapter 250 comprises a controller 412, a first header extraction module 402 and a second header extraction module 404. The first header extraction module 402 has an input connected to link 452, for receiving packets from the secure-incapable party 12. The packets so received comprise a payload portion and a header portion. The first header extraction module 402 is operative to provide the header portions and the payload portions of the received packets separately to the controller 412. In the illustrated embodiment, the header portions are provided along a link HDR 456, while the payload portions are provided along a link PLD 454. Similarly, the second header extraction module 404 has an input connected to link 462, for receiving packets from the remote party 14. The second header extraction module 404 is operative to provide the header portions and the payload portions of the received packets separately to the controller 412. In the illustrated embodiment, the header portions are provided along a link HDR 466, while the payload portions are provided along a link PLD 464. Of course, it should be appreciated that either or both of the first and second header extraction modules 402, 404 may be integrated with the controller 412.

In addition, the VoIP adapter 250 comprises an off-hook detector 406, which may be integrated with the controller 412 or may be implemented as a separate functional unit that is connected in parallel with the output of the second header extraction module 404. The off-hook detector 406 comprises suitable circuitry, software and/or control logic for detecting, on the basis of the signal contained in the payload portions received from the second header extraction module 404, whether the remote party 14 has entered an off-hook condition. As an output, the off-hook detector 406 may simply provide the controller 412 with an indication as to when an off-hook condition has been detected. Those skilled in the art will find it within their ability to design a circuit, device or software suitable for this purpose.

The controller 412 comprises suitable circuitry, software and/or control logic for processing the data received from the first and second header extraction modules 402, 404 and the off-hook detector 406, and consequently generating the packets supplied on communication links 460 and 472. The data is processed and generated in accordance with a method which is described in further detail herein below.

It should be mentioned that the controller (312 or 412) in the adapter (200 or 250) does not know, a priori, whether the remote party 14 is secure-capable or secure-incapable. Of course, a more instructive description is possible when the remote party 14 is assumed to be secure-capable. However, such an assumption about the security capabilities of the remote party 14 cannot be made until ascertained by the POTS adapter 200 during operation, as will now be described. Also, it should be appreciated that operation of the controller (312 or 412) in the respective adapter (200 or 250) will vary depending on whether the secure-incapable party 12 is the calling party or the called party. The case where the secure-incapable party 12 is the calling party is now considered, for both the POTS adapter 200 and the VoIP adapter 250.

Figure 5A:
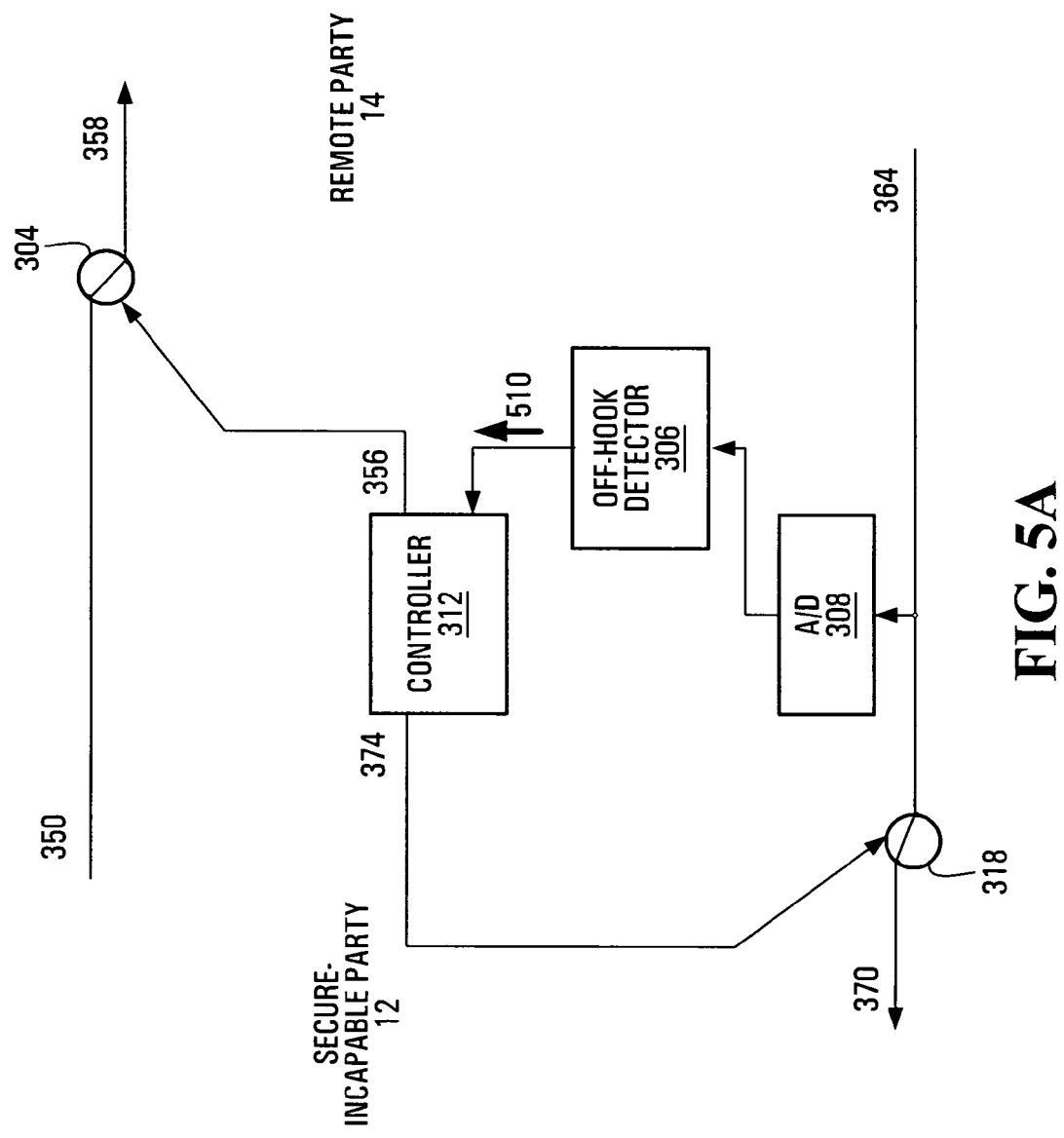
Figure 7:
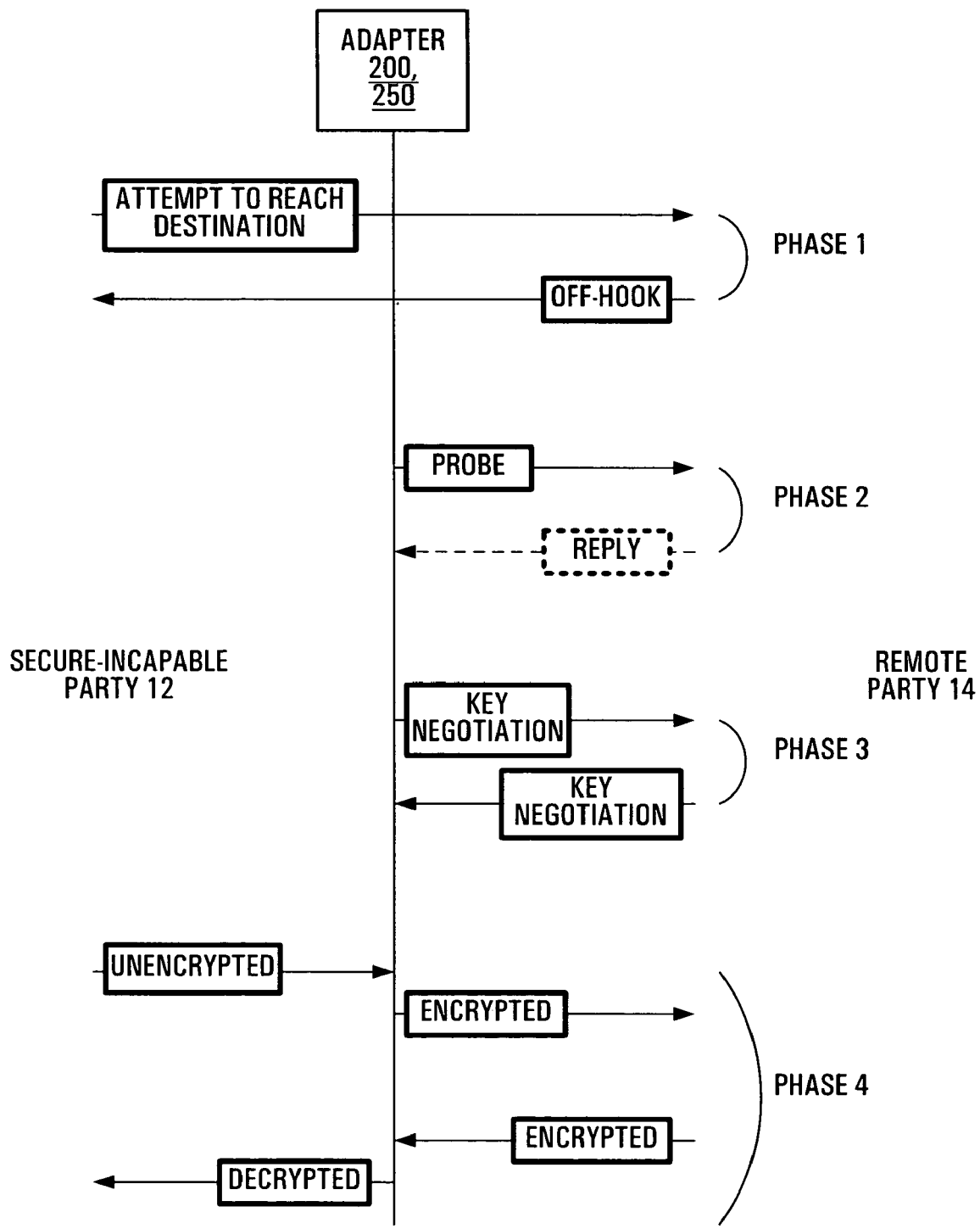
FIG. 7 is a flow diagram illustrating the steps of the process of FIGS. 5A-5E or, alternatively, the process of FIG. 6A-6E.

Thus, with reference to FIG. 7 and FIG. 5A, the controller 312 begins at PHASE 1, wherein the secure-incapable party 12 places a call to the remote party 14. During PHASE 1, the first transfer unit 304 is set to operate in a "flow-through" state, whereby the signal arriving on link 350 is transferred over to link 358. Similarly, the second transfer unit 318 is set to operate in a flow-through state, whereby the signal arriving on link 364 is transferred over to link 370. It is recalled that the controller 312 uses the control signals 356, 374 to control operation of the first and second transfer units 394, 318.

Now, assuming that the call placed by the secure-incapable party 12 is answered by the remote party 14, the remote party 14 will enter an off-hook condition and this will be detected by the off-hook detector 306, which provides a message 510 indicative of this condition to the controller 312. Those skilled in the art will appreciate that it may also be advantageous for the controller 312 to detect the attempt by the secure-incapable party 12 to reach the remote party 14 in the first place. Such an attempt may manifest itself by way of a DTMF sequence present in the signal received via the first analog-to-digital converter 302 (see FIG. 3). In an embodiment, upon detection of a DTMF sequence, the controller 312 may initiate a timeout period, during which the controller 312 is made sensitive to receipt of the message 510 from the off-hook detector 306. This limited period of sensitivity may result in a savings of processing power, for example. In any event, assuming that the message 510 is received from the off-hook detector 306, the controller 312 now knows that the remote party 14 has answered a call placed by the secure-incapable party 12. However, at this point, the controller 312 still does not know whether the remote party 14 is secure-capable or secure-incapable, and in order to answer this question, operation of the controller 312 passes to PHASE 2.

Figure 5B:
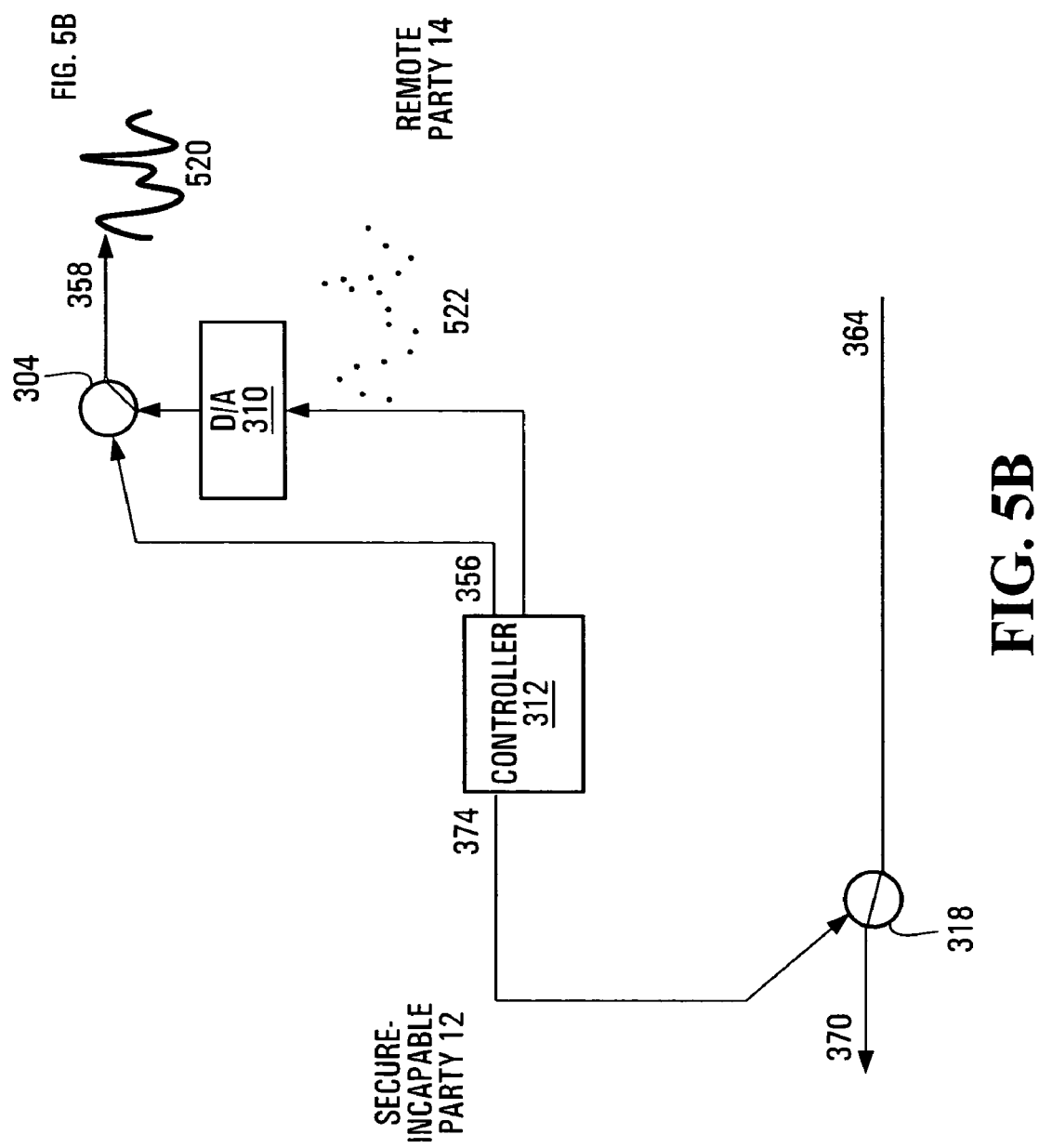

With additional reference now to FIG. 5B, illustrative of a specific embodiment, the controller 312 generates digital probe signal samples 522, which are converted into an analog probe signal 520 by the first digital-to-analog converter 310. The analog probe signal 520 may thus be made to encode desired probe data in any conventional way, e.g., in terms of frequency, amplitude, amplitude variation, etc. In an alternative embodiment, the analog probe signal 520 is a DTMF sequence generated by supplying the probe data to a DTMF generator, which bypasses the need for the first digital-to-analog converter 310. In another alternative embodiment, the analog probe signal 520 is a line coded signal generated by supplying the probe data to a line coder. In any event, the analog probe signal 520 is sent to the remote party 14 in an attempt to determine whether the latter is secure-capable. To enable this, the controller 312 changes the signal on control link 356 in order to cause the first transfer unit 304 to operate in an "add" state, whereby the analog probe signal 520 arriving from the first digital-to-analog converter 310 is transferred over to link 358 towards the remote party 14. Meanwhile, the second transfer unit 318 continues to operate in a flow-through state, whereby the signal arriving on link 364 is transferred over to link 370.

Referring now to FIG. 5C, if the remote party 14 is secure-capable, then the remote party 14 will respond to the analog probe signal 520 with a reply signal 530 that is received via link 364 and converted into digital reply signal samples 532 by the second analog-to-digital converter 308. However, if the remote party 14 is not secure-capable, then the analog probe signal 520 will not elicit a reply signal from the remote party 14. In the latter case, i.e., when the remote party 14 is deemed to be secure-incapable after a timeout period, then no further action is taken by the controller 312 and the call proceeds in the usual fashion, without intervention by the POTS adapter 200. On the other hand, if indeed the reply signal 530 is received as shown in FIG. 5C, then operation of the controller 312 passes to PHASE 3 as now described with reference to FIG. 5D.

With the knowledge that the remote party 14 is secure-capable, the controller 312 begins a key negotiation process. Specifically, key negotiation signal samples 541 are generated by the controller 312. These are converted by the first digital-to-analog converter 310 into a key negotiation signal 540. Meanwhile, the first transfer unit 304 continues to operate in an "add" state, which causes the key negotiation signal 540 arriving from the first digital-to-analog converter 310 to be transferred over to link 358. In addition, the remote party 14 will generate a key negotiation signal 544 of its own, which is received by the second analog-to-digital converter 308 and converted into key negotiation signal samples 545. It should be appreciated that the exchange of the key negotiation signals 540, 544 may be part of a known algorithm for negotiating a secure transfer of information, such as the transmission of a public key by the controller 312 for use by the remote party 14 and a public key by the remote party 14 for use by the controller 312. Those of skill in the art will find it a matter of routine to select a suitable algorithm and program the controller 312 accordingly.

It should also be noted if PHASE 3 is executed within a few milliseconds after an off-hook condition has been detected by the off-hook detector 306, the exchange of the key negotiation signals 540, 544 can be effected without being noticeable by either of the two parties 12, 14 on the call. Moreover, if the key negotiation is effected in the voice band, then for added audio shielding during the PHASE 3, the controller 312 can be adapted to generate a reference signal 548 (e.g., a signal that emulates silence or background noise). In order to have the reference signal 548 sent to the secure-incapable party 12 during PHASE 3, the controller 312 changes the signal on control link 374 in order to cause the second transfer unit 318 to operate in the "add" state, whereby the signal arriving from the second digital-to-analog converter 320 is transferred over to link 370.

Once the key negotiation of PHASE 3 is complete, the secure exchange of information can begin, involving the POTS adapter 200 at one end of the secure connection and the secure-capable remote party 14 at the other end of the secure connection. With reference to FIG. 7 and additionally to FIG. 5E, the controller 312 enters PHASE 4, during which both transfer units 304, 318 are set to operate in the "add" state. In a first direction of communication, an analog signal 551 received via link 350 arrives from the secure-incapable party 12 and therefore is typically unencrypted or encrypted to an insufficient degree. The analog signal 551 is converted by the first analog-to-digital converter 302 into unencrypted signal samples 550. The controller 312 executes an encryption algorithm on the unencrypted signal samples 550, transforming them into encrypted signal samples 552. The encrypted signal samples 552 are provided to the first digital-to-analog converter 310, which outputs an analog signal 553 onto link 358.

In the opposite direction of communication, an analog signal 555 received via link 364 arrives from the secure-capable remote party 14 and therefore is encrypted. The analog signal 555 is converted by the second analog-to-digital converter 308 into encrypted signal samples 554. The controller 312 executes a decryption algorithm on the encrypted signal samples 554, transforming them into decrypted signal samples 556. The decrypted signal samples 556 are provided to the second digital-to-analog converter 320, which outputs an analog signal 557 onto link 370. The above-described operation continues until either party assumes the on-hook condition, as can be detected by standard circuitry, software or control logic (not shown).

Figure 6A:
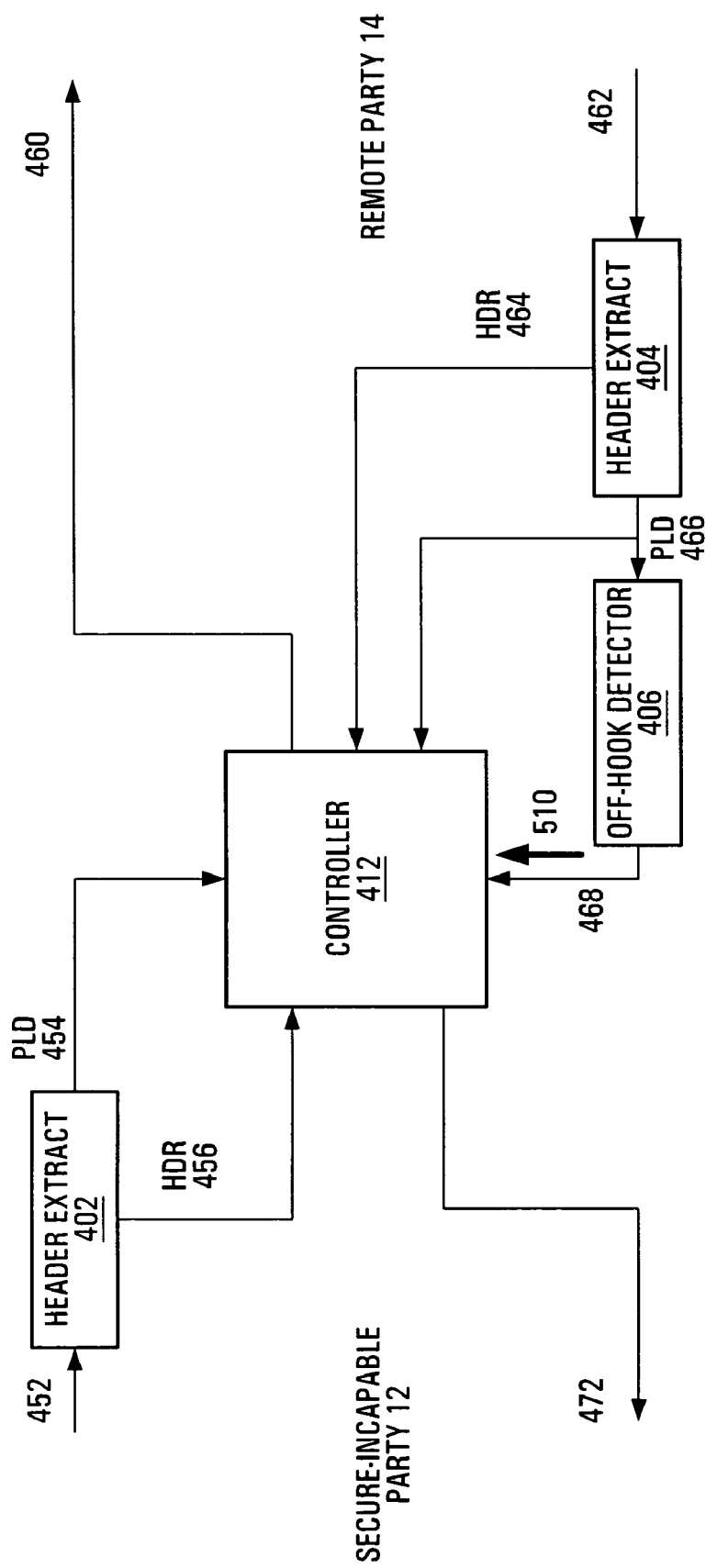
FIGS. 6A-6E show activity of the VoIP adapter of FIG. 4 during a process in accordance with an embodiment of the present invention.

With reference now to FIGS. 6A-68 and 7, operation of the VOIP adapter 250 is now described. Specifically referring to FIGS. 6A and 7, the controller 412 begins at PHASE 1, wherein the secure-incapable party 12 places a call to the remote party 14. During PHASE 1, the controller 412 is adapted to transfer the packets arriving via link 452 over to link 460 without altering their content. This can be done by reconstructing the header portions received along link 456 and the payload portions received along link 454. Of course, it is envisaged that the controller may need to process the received packets, so as to include additional information (e.g., time stamp) or for routing purposes. Similarly, the controller 412 is adapted to transfer the packets arriving on link 462 over to link 472. Meanwhile, the off-hook detector 406 continues to monitor the payload portion of incoming packets as received from the remote party 14 via the second header extraction module 404 and link 462.

Assuming that the call placed by the secure-incapable party 12 is answered by the remote party 14, the remote party 14 will enter an off-hook condition and this will be detected by the off-hook detector 406, which provides a message 510 indicative of this condition to the controller 412. Those skilled in the art will appreciate that it may also be advantageous for the controller 412 to detect the attempt by the secure-incapable party 12 to reach the remote party 14 in the first place. Such an attempt may manifest itself by way of waveform data (e.g., compressed PCM samples) representative of a DTMF sequence present in the payload portion of a stream of packets received from the header extraction module 402. In other cases, the attempt to establish the call may be detected by looking out for specific addresses in the header portion of the packets received from the header extraction module 402. In any event, assuming that the message 510 is received from the off-hook detector 406, the controller 412 now knows that the remote party 14 has answered a call placed by the secure-incapable party 12. However, at this point, the controller 412 still does not know whether the remote party 14 is secure-capable or secure-incapable, and in order to answer this question, operation of the controller 412 passes to PHASE 2.

Figure 6B:
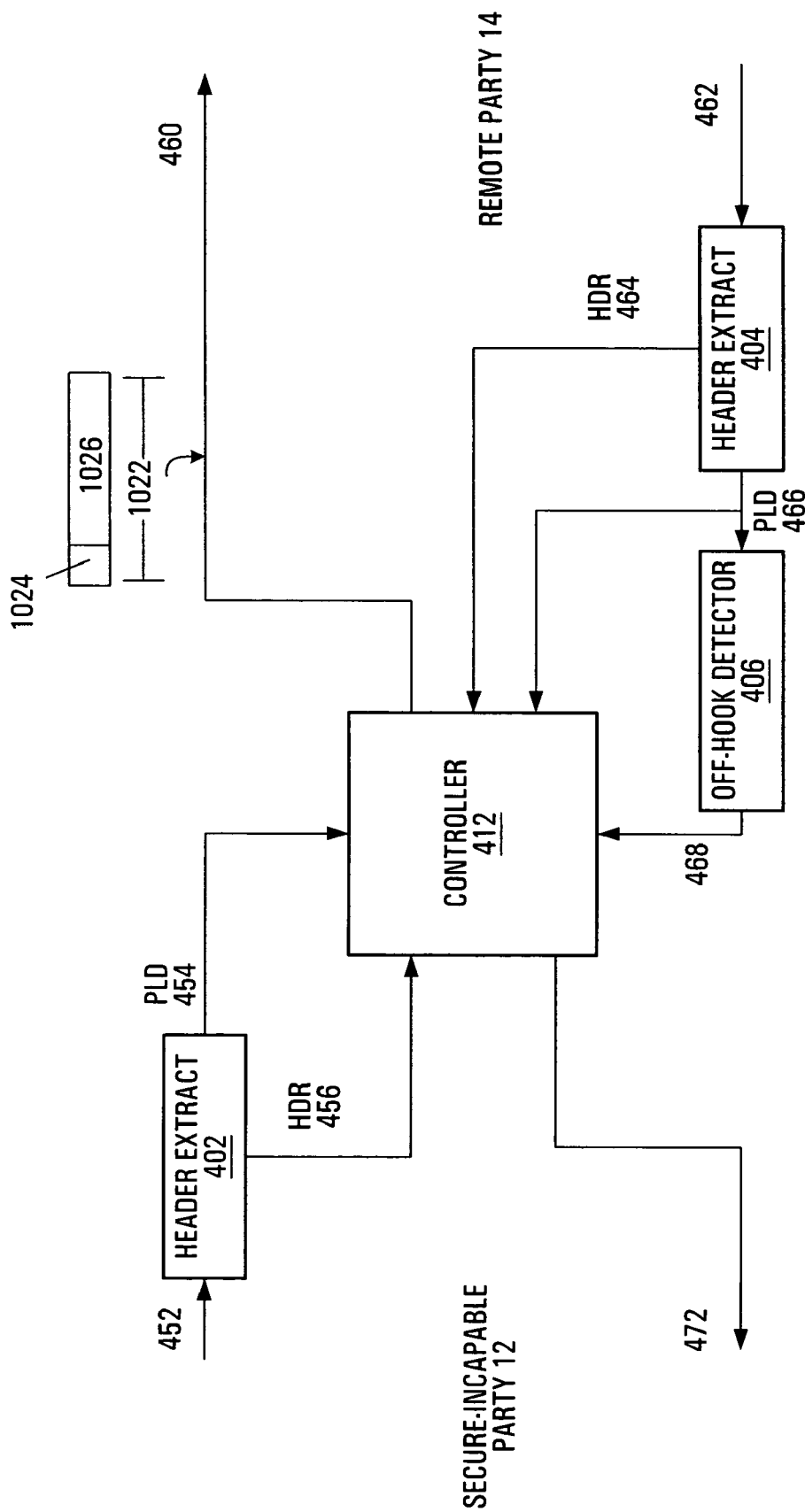

With reference to FIGS. 6B and 7, the controller 412 generates a stream of packets 1022, each having a header portion 1024 and a payload portion 1026, which are sent to the remote party 14 in an attempt to determine whether the remote party 14 is secure-capable. Note that the VoIP adapter 250 does not know whether the remote party 14 is being reached by via a digital communication link or an analog POTS line. Therefore, to ensure maximum flexibility, the payload portion 1026 of the packets 1022 carries waveform data (e.g., compressed PCM samples) representative of a desired analog probe signal. The waveform data carried in the payload portions 1026 can thus encode probe data in any conventional way, e.g., in terms of frequency, amplitude, amplitude variation, etc. In an alternative embodiment, the waveform data carried in the payload portions 1026 is generated by supplying the probe data to a modulator with an analog output (e.g., DTMF generator or line coder), sampling the analog output of the modulator and PCM compressing the samples. In another alternative embodiment, the waveform data carried in the payload portions 1026 is generated by supplying the probe data to a digital modulator and PCM compressing the digital output of the modulator. It should be appreciated that the desired analog probe signal represented by the waveform data carried in the payload portions 1026 can be made to correspond to the analog probe signal 520 that is generated by the POTS adapter 200. This has certain advantages, as from the standpoint of the remote party 14, it is now irrelevant what type of adapter is being used to secure communication with the secure-incapable party 12.

In the case where the remote party 14 is being reached via a digital communication link, the waveform data will be received by the remote party 14 "as is", e.g., as compressed PCM samples carried in the payload portion of successive received packets. The waveform data is then converted by the remote party 14 into the desired analog probe signal. On the other hand, where the remote party 14 is being reached via an analog POTS line, the waveform data will be converted by an intermediate VoIP/POTS gateway into the desired analog probe signal prior to being received at the remote party 14. In either case, the remote party 14 will be provided with the desired analog probe signal.

Figure 6C:
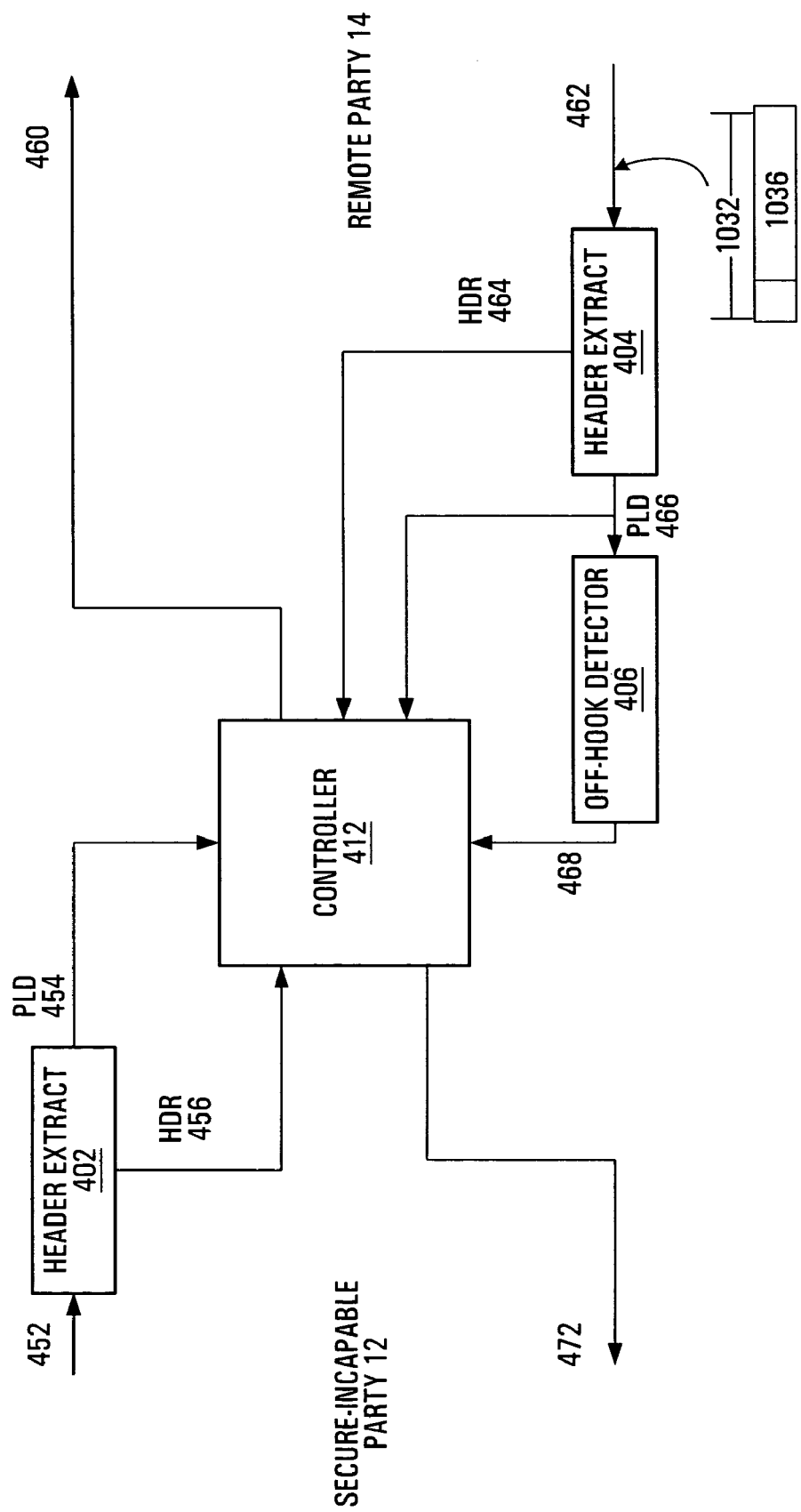
Figure 6D:
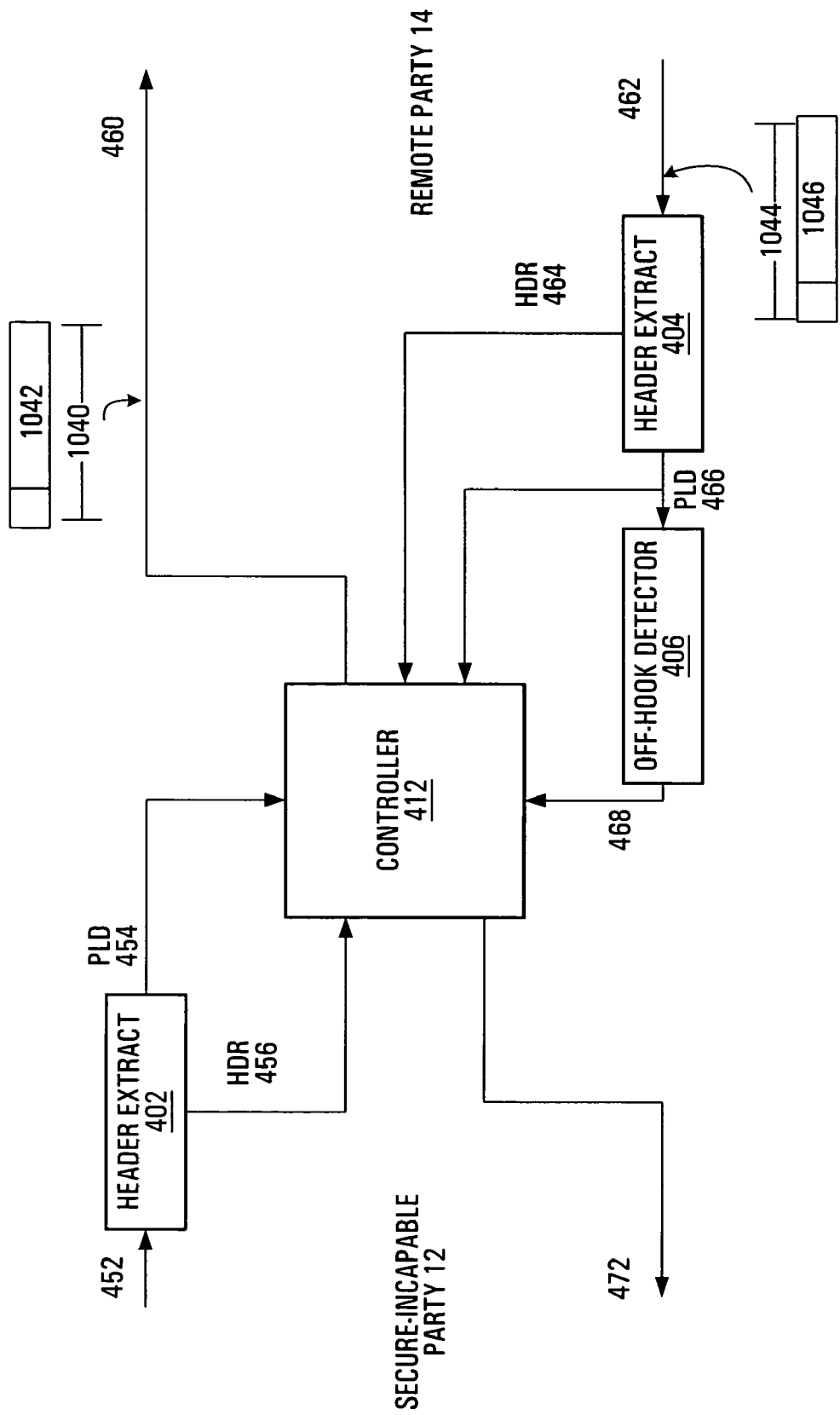

If the remote party 14 is not secure-capable, then the presence of the analog probe signal will not be detected by the remote party 14. In the latter case, i.e., when the remote party 14 is deemed to be secure-incapable after a timeout period, then no further action is taken by the controller 412 and the call proceeds in the usual fashion, without intervention by the VoIP adapter 250. However, referring to FIG. 6C, if the remote party 14 is secure-capable, then the presence of the analog probe signal at the remote party 14 will be detected and will elicit the generation of the previously described reply signal 530. Consequently, at the adapter 250, the second header extraction module 404 receives a stream of packets 1032 whose payload portions 1036 carry waveform data (e.g., compressed PCM samples) representative of the reply signal 530. Operation of the controller 412 then passes to PHASE 3 as now described with reference to FIG. 6D.

With the knowledge that the remote party 14 is secure-capable, the controller 412 begins a key negotiation process by sending a stream of packets 1040 onto link 460. The packets 1040 have payload portions 1042 that carry waveform data (e.g., compressed PCM samples) representative of a key negotiation signal. The key negotiation signal represented by the waveform data can be made to correspond to the key negotiation signal 540 that is generated by the POTS adapter 200. This has certain advantages, as from the standpoint of the remote party 14, it is now irrelevant what type of adapter is being used to secure communication with the secure-incapable party 12.

Figure 5D:
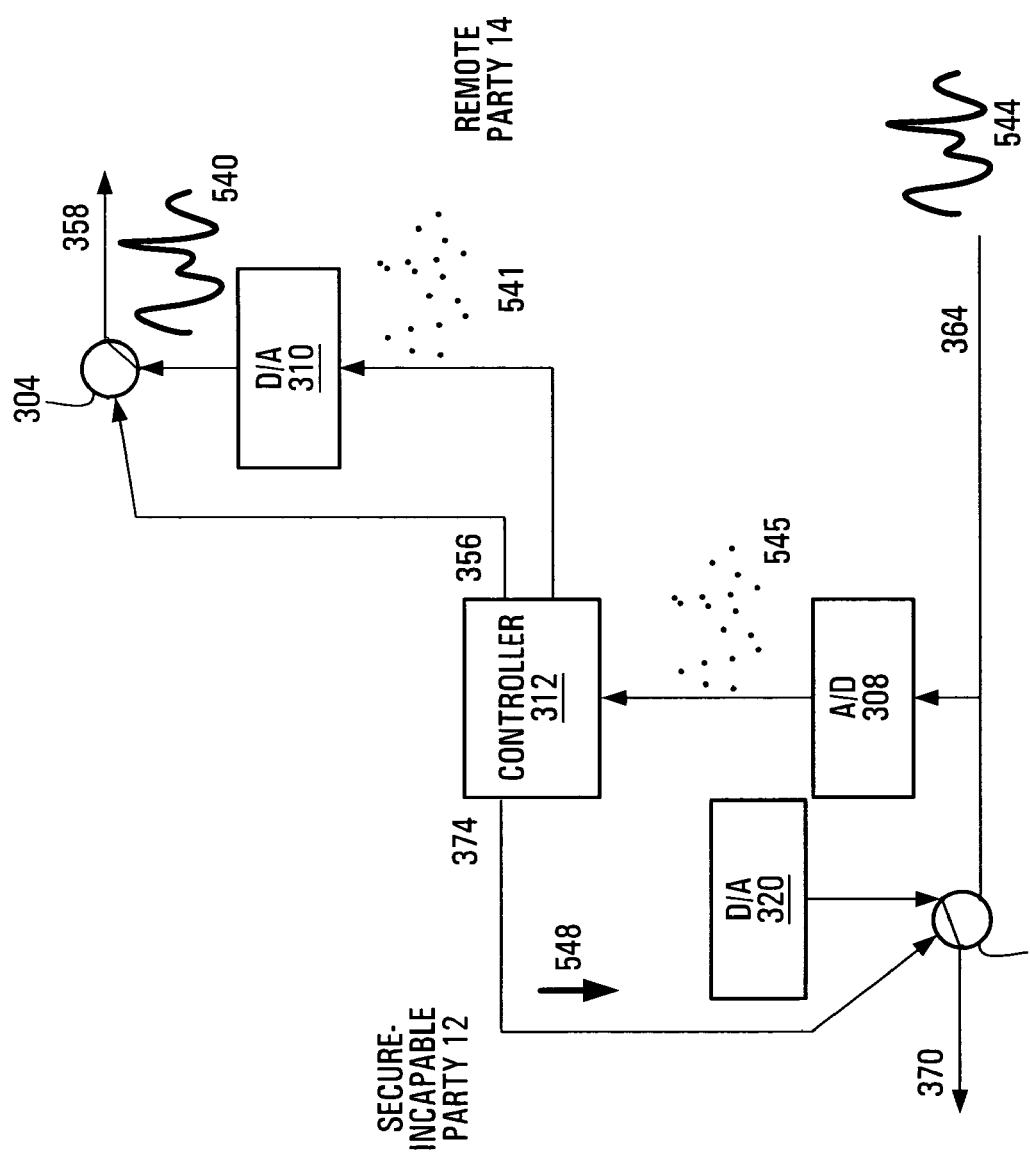
Figure 5E:
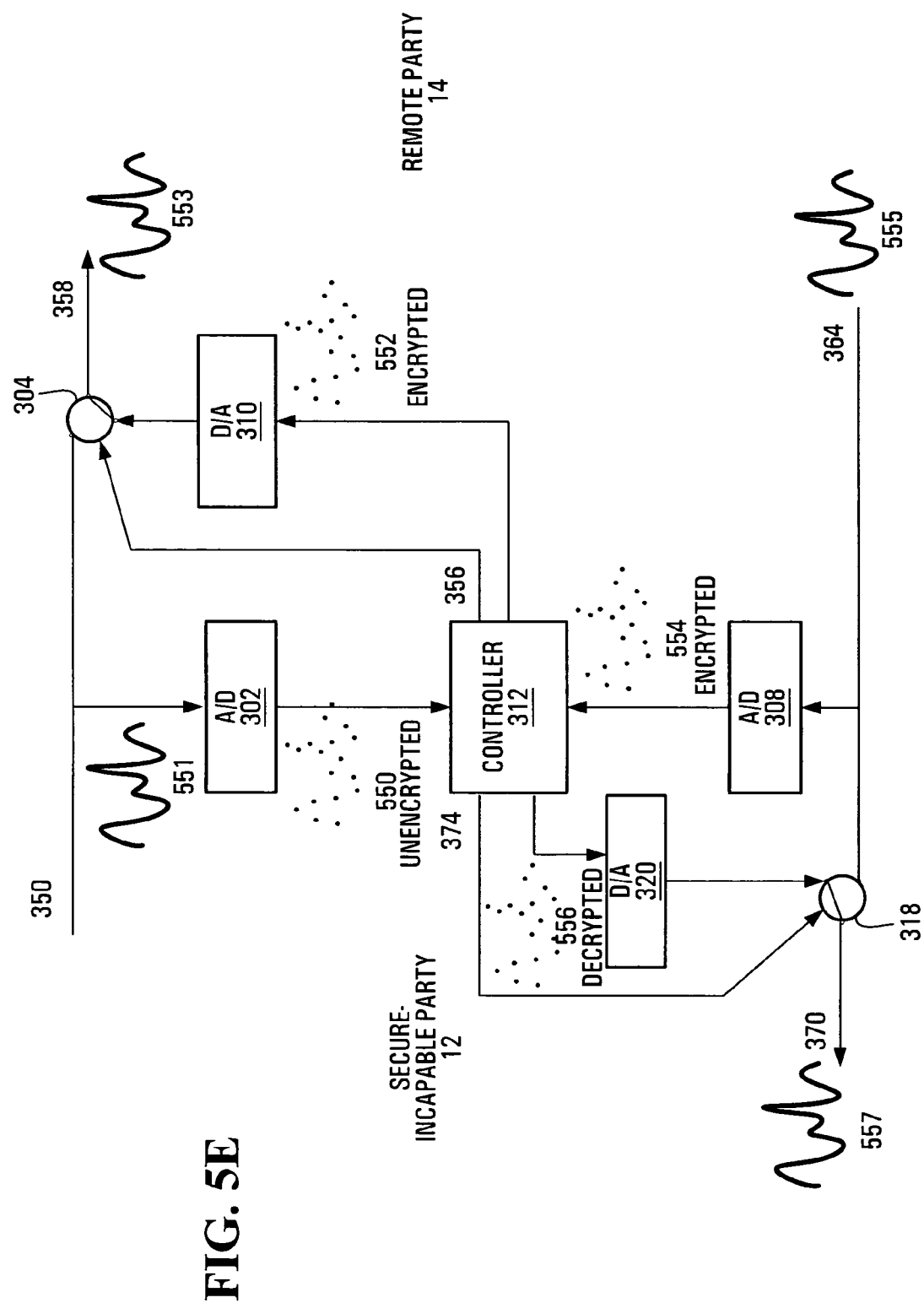

In addition, the remote party 14 will generate a key negotiation signal 544 as previously described with reference to FIG. 5D. Consequently, at the adapter 250, the second header extraction module 404 receives a stream of packets 1044 whose payload portions 1046 carry waveform data (e.g., compressed PCM samples) representative of the key negotiation signal 544. It should be appreciated that the exchange of the key negotiation signals 540, 544 may be part of a known technique for negotiating a secure transfer of information, such as the transmission of a public key by the controller 412 for use by the remote party 14 and a public key by the remote party 14 for use by the controller 412. Those of skill in the art will find it a matter of routine to select a suitable algorithm and program the controller 412 accordingly.

It should also be noted if PHASE 3 is executed within a few milliseconds after an off-hook condition has been detected by the off-hook detector 406, the exchange of the key negotiation signals 540, 544 can be effected without being noticeable by either of the two parties 12, 14 on the call. During this time, the controller 412 may be operative to not issue any packets towards the secure-incapable party 12 via link 472. Alternatively, the controller 412 may be on the lookout for packets received by the second header extraction module 404 that carry speech or other data, and may forward those to the secure-incapable party 12 via link 472.

Figure 6E:
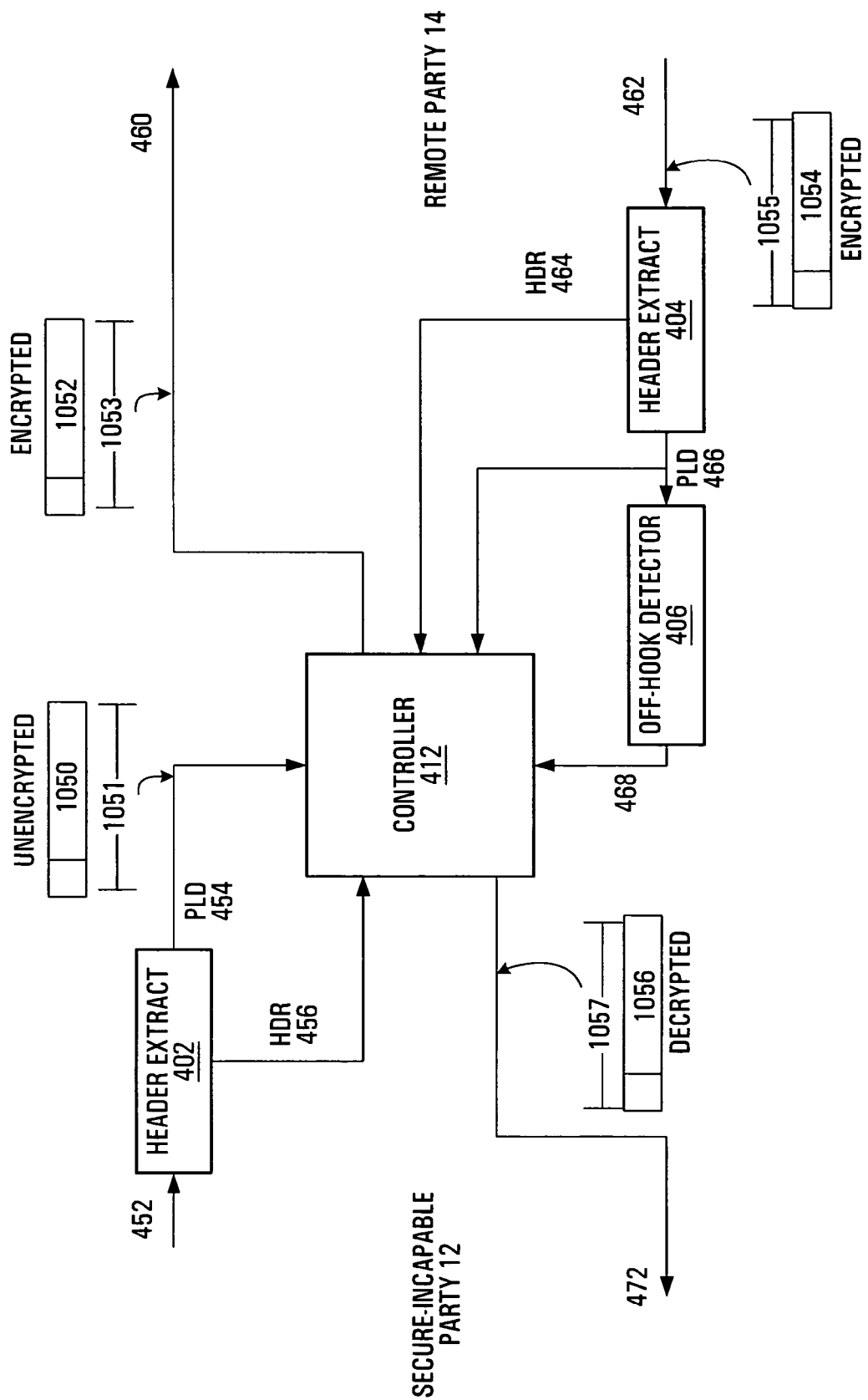

Once the key negotiation of PHASE 3 is complete, the secure exchange of information can begin, involving the VoIP adapter 250 at one end of the secure connection and the secure-capable remote party 14 at the other end of the secure connection. With reference to FIGS. 6E and 7, the controller 312 enters PHASE 4. In a first direction of communication, the first header extraction module 402 receives a stream of packets 1051 whose payload portions 1050 carry waveform data (e.g., compressed PCM samples) representative of a media signal (e.g., speech, facsimile, audio, video). Since the packets 1051 arrive from the secure-incapable party 12, the waveform data is unencrypted (or insufficiently encrypted). The controller 412 executes an encryption algorithm on the unencrypted waveform data, transforming it into encrypted waveform data. The encrypted waveform data is inserted into the payload portions 1052 of a stream of packets 1053. Each of the packets 1053 is also provided with the original header received along link 456 and is sent onto link 460 towards the remote party 14.

In the opposite direction of communication, the second header extraction module 404 receives a stream of packets 1055 whose payload portions 1054 carry encrypted waveform data (e.g., compressed PCM samples) representative of a media signal (e.g., speech, facsimile, audio, video). The waveform data is encrypted since the packets 1055 arrive from the remote party 14, which has been found to be secure-capable. The controller 412 executes a decryption algorithm on the encrypted waveform data, transforming it into decrypted waveform data. The decrypted waveform data is inserted into the payload portions 1056 of a stream of packets 1057. Each of the packets 1057 is also provided with the original header received along link 464 and is sent onto link 472 towards the secure-incapable party 12. The above process continues until either party enters an on-hook condition, as can be detected by standard circuitry, software or control logic (not shown).

With general reference to FIGS. 3 and 4, consider now the case where the remote party 14 is the calling party and the secure-incapable party 12 is the called party. Under such circumstances, the adapter (200 or 250) enters called party mode. In the case of the POTS adapter 200, called party mode is entered upon detecting the analog probe signal 520 in the signal received along link 364. In the case of the VoIP adapter 250, called party mode is entered upon detecting the desired analog probe signal upon conversion of waveform data (e.g., compressed PCM samples) carried in the payload portions of a stream of packets received along link 462.

Upon entering called party mode, the adapter sends a reply signal. In the case of the POTS adapter 200, the reply signal is sent as an analog signal 530 along link 364. In the case of the VoIP adapter 250, the reply signal is converted into waveform data (e.g., compressed PCM samples), which is then inserted into the payload portions of a stream of packets sent onto link 460. The controller (312 or 412, as appropriate) then negotiates with the remote party 14, and consequently the secure exchange of information may begin. Details of the negotiation and transmittal of secure information are similar to those already described and therefore are omitted, as those of ordinary skill in the art will be capable of implementing suitable circuits, devices or software based on the foregoing description.

Thus, it has been shown how the use of an adapter 200, 250 allows information to be exchanged in a secure fashion over the portion 18 of the call between the secure-incapable party 12 and a secure-capable remote entity 14 which traverses the data network 16.

Moreover, it should be emphasized that the correspondence between waveform data and PCM samples has been made by way of example only and not in a limiting sense. While speech signal samples are typically transmitted over packet-based networks in "a-law" or "mu-law" pulse code modulated (PCM) format, this is only an example of the various possibilities. For example, it is envisaged that some networks may not provide compression of the digital speech samples, and that other networks may provide compression of a different kind. An example of a different kind of compression is the use of a vocoder, in which case the waveform data would correspond to the output of the vocoder.

Furthermore, those of ordinary skill in the art will appreciate that the digital-to-analog converters 310, 320 and analog-to-digital converters 302, 308 described with reference to the POTS adapter 200 need not be discrete components and in fact may be optional, depending on the technology used to implement the controller 302. Moreover, if a converter is indeed used, the type of converter (e.g., standard, sigma-delta, etc.) can be varied to meet operational requirements without departing from the scope of the invention.

Those skilled in the art will further appreciate that in some embodiments, the functionality of the controllers 312, 412, header extraction modules 402, 404 and off-hook detectors 306, 406 may be implemented as pre-programmed hardware or firmware elements (e.g., application specific integrated circuits (ASICs), electrically erasable programmable read-only memories (EEPROMs), etc.), or other related components. In other embodiments, the functional component in question may be implemented as an arithmetic and logic unit (ALU) having access to a code memory (not shown) which stores program instructions for the operation of the ALU. The program instructions could be stored on a medium which is fixed, tangible and readable directly by the functional component in question, (e.g., removable diskette, CD-ROM, ROM, or fixed disk), or the program instructions could be stored remotely but transmittable to the functional component in question via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

What is claimed is:

1. A method of securing information exchanged between a calling party and a called party, comprising:
   generating a first signal representative of an analog probe signal, wherein the first signal comprises a stream of packets, each packet comprising a header portion and a payload portion, the payload portion comprising waveform data representative of the analog probe signal;
   releasing the first signal towards the called party;
   responsive to receipt from the called party of a second signal responsive to the analog probe signal and indicative of an ability of the called party to participate in a secure information exchange, negotiating with the called party to securely exchange subsequent information with the called party.

2. The method defined in claim 1, wherein the analog probe signal encodes data indicative of an attempt to determine the ability of the called party to participate in a secure information exchange.

3. The method defined in claim 2, further comprising encoding said data into the analog probe signal.

4. The method defined in claim 3, wherein encoding comprises generating a DTMF sequence.

5. The method defined in claim 3, wherein encoding comprises passing said data through a line coder.

6. The method defined in claim 1, wherein the waveform data representative of the analog probe signal comprises samples of the analog probe signal.

7. The method defined in claim 6, wherein the samples are compressed PCM samples.

8. The method defined in claim 6, wherein the samples are uncompressed PCM samples.

9. The method defined in claim 6, wherein generating the first signal comprises:
   generating the samples of the analog probe signal;
   inserting the samples of the analog probe signal into the payload portion of respective packets in the stream of packets.

10. The method defined in claim 9, wherein the analog probe signal encodes data indicative of an attempt to determine the ability of the called party to participate in a secure information exchange.

11. The method defined in claim 10, further comprising encoding said data into the samples of the analog probe signal.

12. The method defined in claim 11, wherein encoding comprises:
   passing said data through a modulator having an analog output;
   sampling the output of the modulator.

13. The method defined in claim 11, wherein encoding comprises passing said data through a modulator having a digital output.

14. The method defined in claim 13, wherein said modulator is a DTMF generator.

15. The method defined in claim 11, wherein encoding comprises:
   passing said data through a line coder having an analog output;
   sampling the output of the line coder.

16. The method defined in claim 1, further comprising:
   monitoring a line condition of the called party;
   responsive to determining the line condition of the called party to be off-hook, releasing the first signal towards the called party.

17. The method defined in claim 1, wherein negotiating comprises:
   exchanging at least one key for data encryption.

18. The method defined in claim 1, further comprising:
   securely exchanging the subsequent information with the called party.

19. The method defined in claim 18, wherein securely exchanging the subsequent information with the called party comprises:
   receiving from the calling party samples of a called-party-destined signal;
   encrypting the samples of the called-party-destined signal into encrypted samples of the called-party-destined signal;
   releasing the encrypted samples of the called-party-destined signal towards the called party.

20. The method defined in claim 19, further comprising:
   receiving from the calling party the called-party-destined signal; and
   sampling the called-party-destined signal to produce the samples of the called-party-destined signal.

21. The method defined in claim 19, wherein securely exchanging the subsequent information with the called party further comprises:
   receiving samples of a calling-party-destined signal;
   decrypting the samples of the calling-party-destined signal into decrypted samples of the calling-party-destined signal;
   releasing the decrypted samples of the calling-party-destined signal towards the calling party.

22. The method defined in claim 21, further comprising:
   receiving from the called party the calling-party-destined signal; and
   sampling the calling-party-destined signal to produce the samples of the calling-party-destined signal.

23. The method defined in claim 22, wherein each of the encrypting and decrypting is performed on a basis of at least one key exchanged during the negotiating.

24. The method defined in claim 18, wherein securely exchanging the subsequent information with the called party comprises:
   receiving a stream of called-party-destined packets, each called-party-destined packet comprising a header portion and a payload portion, the payload portion comprising data to be encrypted;
   encrypting the data in the payload portion of the called-party-destined packets, thereby to produce encrypted data for each called-party-destined packet;
   combining the encrypted data for each called-party-destined packet with the respective header portion to produce a new stream of called-party-destined packets;
   releasing the new stream of called-party-destined packets towards the called party.

25. The method defined in claim 24, wherein securely exchanging the subsequent information with the called party comprises:
   receiving a stream of calling-party-destined packets, each calling-party-destined packet comprising a header portion and a payload portion, the payload portion comprising data to be decrypted;
   decrypting the data in the payload portion of the calling-party-destined packets, thereby to produce decrypted data for each calling-party-destined packet;
   combining the decrypted data for each calling-party-destined packet with the respective header portion to produce a new stream of calling-party-destined packets;

releasing the new stream of calling-party-destined packets towards the calling party.

26. The method defined in claim 25, wherein each of the encrypting and decrypting is performed on a basis of at least one key exchanged during the negotiating.

27. The method defined in claim 1, wherein said negotiating is performed only if said second signal is received within a timeout period.

28. The method defined in claim 27, wherein the method further comprises allowing the subsequent information to be exchanged non-securely if said second signal is not received within the timeout period.

29. Apparatus for securing communications between a calling party and a called party, comprising:
   a controller operative to generate a first signal comprising an analog probe signal;
   an output interface comprising a first transfer unit and a second transfer unit each controllable by the controller to operate either in a first state or in a second state;
   an input interface operative to receive a second signal comprising an analog response signal responsive to the analog probe signal and indicative of an ability of the called party to participate in a secure information exchange;
   the controller being responsive to the second signal to negotiate with the called party a secure exchange of information with the called party;
   wherein in its first state, the first transfer unit passes towards the called party an analog signal received from the calling party and in its second state the first transfer unit passes towards the called party signals generated by the controller;
   wherein in its first state, the second transfer unit passes towards the calling party an analog signal received from the called party and in its second state the second transfer unit passes towards the calling party signals generated by the controller;
   wherein the controller is further operative to cause the first transfer unit to operate in its second state during generation of the analog probe signal, thereby to cause the first transfer unit to pass towards the called party the analog probe signal.

30. The apparatus defined in claim 29, wherein the controller is further operative to cause the second transfer unit to operate in its first state during generation of the analog probe signal, thereby to cause the second transfer unit to pass towards the calling party the analog signal received from the called party.

31. The apparatus defined in claim 30, wherein the controller is further operative to respond to absence of the analog response signal within a predetermined amount of time by continuing to operate the first transfer unit in its first state and the second transfer unit in its first state.

32. The apparatus defined in claim 31, wherein the controller is further operative to cause the first transfer unit to operate in its first state during reception of the analog response signal, thereby to cause the first transfer unit to pass towards the called party the analog signal received from the calling party.

33. The apparatus defined in claim 32, wherein the input interface comprises an analog-to-digital converter to convert the analog response signal from an analog format to a digital format.

34. The apparatus defined in claim 30, wherein the controller being responsive to the analog response signal to negotiate with the called party a secure exchange of information with the called party comprises the controller being operative to generate first key negotiation signals released towards the called party via the output interface and to interpret second key negotiation signals received from the called party via the input interface.

35. The apparatus defined in claim 34, wherein the controller is further operative to cause the first transfer unit to operate in its second state during negotiation with the called party, thereby to cause the first transfer unit to pass towards the called party the first key negotiation signals.

36. The apparatus defined in claim 35, wherein the controller being responsive to the analog response signal to negotiate with the called party a secure exchange of information with the called party further comprises the controller being operative to generate a reference signal for transmission to the calling party during negotiation.

37. The apparatus defined in claim 36, wherein the controller is further operative to cause the second transfer unit to operate in its second state during negotiation with the called party, thereby to cause the second transfer unit to pass towards the calling party the reference signal.

38. The apparatus defined in claim 37, wherein the reference signal emulates silence.

39. The apparatus defined in claim 37, wherein the reference signal emulates background noise.

40. The apparatus defined in claim 30, wherein the controller is further operative to commence the secure exchange of information with the called party.

41. The apparatus defined in claim 40, wherein the controller is further operative to receive via the input interface samples of a called-party-destined signal, the apparatus further comprising:
   means for encrypting the samples of the called-party-destined signal into encrypted samples of the called-party-destined signal;
   wherein the controller is further operative to release the encrypted samples of the called-party-destined signal via the output interface.

42. The apparatus defined in claim 41, further comprising:
   a digital-to-analog converter operative to convert the encrypted samples of the called-party-destined signal into a new called-party-destined signal;
   wherein the controller is further operative to cause the first transfer unit to operate in its second state during the secure exchange of information, thereby to cause the first transfer unit to pass towards the called party the new called-party-destined signal.

43. The apparatus defined in claim 42, wherein the controller is further operative to receive via the input interface samples of a calling-party-destined signal, the apparatus further comprising:
   means for decrypting the samples of the calling-party-destined signal into decrypted samples of the calling-party-destined signal;
   wherein the controller is further operative to release the decrypted samples of the calling-party-destined signal via the output interface.

44. The apparatus defined in claim 43, further comprising:
   a digital-to-analog converter operative to convert the decrypted samples of the calling-party-destined signal into a new calling-party-destined signal;
   wherein the controller is further operative to cause the second transfer unit to operate in its second state during the secure exchange of information, thereby to cause the second transfer unit to pass towards the calling party the new calling-party-destined signal.

45. The apparatus defined in claim 29, wherein the first signal comprises a stream of packets, each packet comprising a header portion and a payload portion, the payload portion comprising waveform data representative of the analog probe signal.

46. The apparatus defined in claim 45, wherein the waveform data representative of the analog probe signal comprises samples of the analog probe signal.

47. The apparatus defined in claim 29, wherein the second signal comprises a stream of packets, each packet comprising a header portion and a payload portion, the payload portion comprising waveform data representative of the analog response signal.

48. The apparatus defined in claim 47, wherein the samples are PCM samples.

49. The apparatus defined in claim 47, wherein the samples are uncompressed samples.

50. The apparatus defined in claim 29, wherein the controller is further operative to commence the secure exchange of information with the called party.

51. The apparatus defined in claim 50, wherein the controller is further operative to receive via the input interface called-party-destined packets, each called-party-destined packet comprising a header portion and a payload portion, the payload portion comprising data to be encrypted, the apparatus further comprising:
   means for encrypting the data in the payload portion of the called-party-destined packets, thereby to produce encrypted data for each called-party-destined packet;
   means for combining the encrypted data for each called-party-destined packet with the respective header portion to produce a new stream of called-party-destined packets;
   wherein the controller is further operative to release the new stream of called-party-destined packets via the output interface.

52. The apparatus defined in claim 51, wherein the controller is further operative to receive via the input interface calling-party-destined packets, each calling-party-destined packet comprising a header portion and a payload portion, the payload portion comprising data to be decrypted, the apparatus further comprising:
   means for decrypting the data in the payload portion of the calling-party-destined packets, thereby to produce decrypted data for each calling-party-destined packet;
   means for combining the decrypted data for each calling-party-destined packet with the respective header portion to produce a new stream of calling-party-destined packets;
   wherein the controller is further operative to release the new stream of calling-party-destined packets via the output interface.

53. The method defined in claim 52, wherein each of the encrypting and decrypting is performed on a basis of at least one key exchanged during the negotiating.

54. The apparatus defined in claim 29, further comprising an off-hook detector capable of detecting an off-hook condition of the called party, wherein the controller is further operative to generate the probe signal in response to detection of the off-hook condition of the called party by the off-hook detector.

55. The apparatus defined in claim 29, wherein the controller is configured to negotiate the secure exchange of information with the called party only if said second signal is received within a timeout period.

56. The apparatus defined in claim 55, wherein said controller is operative to allow a non-secure exchange of the information with the called party if said second signal is not received within the timeout period.

57. Apparatus for securing communications between a calling party and a called party, comprising:
   means for generating a first signal representative of an analog probe signal, wherein the first signal comprises a stream of packets, each packet comprising a header portion and a payload portion, the payload portion comprising waveform data representative of the analog probe signal;
   means for releasing the first signal towards the called party;
   means for receiving a second signal representative of an analog response signal responsive to the analog probe signal and indicative of an ability of the called party to participate in a secure information exchange;
   means responsive to the second signal, for negotiating with the called party a secure exchange of information with the called party.

58. A method of securing information exchanged between a calling party and a called party, comprising:
   generating a first signal representative of an analog probe signal;
   releasing the first signal towards the called party;
   responsive to receipt from the called party within a timeout period of a second signal responsive to the analog probe signal and indicative of an ability of the called party to participate in a secure information exchange, negotiating with the called party to securely exchange subsequent information with the called party;
   allowing the subsequent information to be exchanged non-securely if said second signal is not received within the timeout period.

59. Apparatus for securing communications between a calling party and a called party, comprising:
   a controller operative to generate a first signal representative of an analog probe signal;
   an output interface;
   an input interface operative to receive a second signal representative of an analog response signal responsive to the analog probe signal and indicative of an ability of the called party to participate in a secure information exchange;
   the controller being responsive to the second signal to negotiate with the called party a secure exchange of information with the called party if said second signal is received within a timeout period; and
   the controller being operative to allow a non-secure exchange of the information with the called party if said second signal is not received within the timeout period.

* * * * *